(12) United States Patent
Zhou et al.

(10) Patent No.: US 12,323,343 B2
(45) Date of Patent: Jun. 3, 2025

(54) ENABLEMENT OF SIMULTANEOUS BEAM UPDATE ACROSS COMPONENT CARRIERS

(71) Applicant: QUALCOMM Incorporated, San Diego, CA (US)

(72) Inventors: Yan Zhou, San Diego, CA (US); Hamed Pezeshki, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/989,353

(22) Filed: Nov. 17, 2022

(65) Prior Publication Data
US 2023/0085633 A1  Mar. 23, 2023

Related U.S. Application Data

(63) Continuation of application No. 17/069,739, filed on Oct. 13, 2020, now Pat. No. 11,552,753.
(Continued)

(51) Int. Cl.
*H04L 5/00* (2006.01)
*H04W 72/0453* (2023.01)
(Continued)

(52) U.S. Cl.
CPC ....... *H04L 5/0023* (2013.01); *H04W 72/0453* (2013.01); *H04W 72/1273* (2013.01); *H04W 72/20* (2023.01)

(58) Field of Classification Search
CPC ... H04L 5/0023; H04L 5/0048; H04L 5/0094; H04L 5/001; H04W 72/0453; H04W 72/1273; H04W 72/20; H04B 7/0695
See application file for complete search history.

(56) References Cited

U.S. PATENT DOCUMENTS

2011/0134774 A1* 6/2011 Pelletier ............... H04W 76/15
370/242
2012/0281667 A1 11/2012 Chang et al.
(Continued)

OTHER PUBLICATIONS

3GPP: "RAN4 #92 Meeting Report", 3GPP Draft, 3GPP TSG-RAN WG4 Meeting #92bis, R4-1910701 RAN4#92, Meeting Report, 3rd Generation Partnership Project (3GPP), Mobile Competence Centre, 650, Route Des Lucioles, F-06921 Sophia-Antipolis Cedex, France, vol. RAN WG4, No., Chongqing, China, Oct. 14, 2019-Oct. 18, 2019, Oct. 8, 2019 (Oct. 8, 2019), XP051805463, 956 Pages, section 7.10.7.4.
(Continued)

*Primary Examiner* — Kan Yuen
(74) *Attorney, Agent, or Firm* — Loza & Loza. LLP

(57) ABSTRACT

Aspects relate to wireless communication on multiple component carriers. In some examples, a user equipment (UE) may selectively apply transmission configuration indicator (TCI) information and/or spatial relation information received via a medium access control-control element (MAC-CE) to component carriers. In some examples, a UE may apply the TCI information and/or spatial relation information included in a MAC-CE to multiple component carriers if the UE has been configured with a list that includes the component carriers (and, optionally, if a component carrier identified by the MAC-CE is a member of the list of component carriers). If the above condition is (or conditions are) not met, the UE applies the TCI information and/or spatial relation information included in the MAC-CE to the component carrier identified by the MAC-CE.

14 Claims, 14 Drawing Sheets

Related U.S. Application Data

(60) Provisional application No. 62/916,785, filed on Oct. 17, 2019.

(51) Int. Cl.
*H04W 72/1273* (2023.01)
*H04W 72/20* (2023.01)

(56) References Cited

U.S. PATENT DOCUMENTS

| | | | | |
|---|---|---|---|---|
| 2013/0258960 A1* | 10/2013 | Chen | ............ | H04L 1/1671 |
| | | | | 370/329 |
| 2016/0352493 A1 | 12/2016 | Tan et al. | | |
| 2017/0251461 A1* | 8/2017 | Parkvall | ............ | H04L 5/0053 |
| 2018/0288755 A1* | 10/2018 | Liu | ............ | H04W 56/0015 |
| 2019/0239245 A1 | 8/2019 | Davydov et al. | | |
| 2020/0351069 A1* | 11/2020 | Grant | ............ | H04L 5/0098 |
| 2021/0014848 A1* | 1/2021 | Davydov | ............ | H04W 72/23 |
| 2021/0067979 A1* | 3/2021 | Rahman | ............ | H04L 5/0023 |
| 2021/0119741 A1 | 4/2021 | Zhou et al. | | |
| 2021/0153209 A1* | 5/2021 | Guan | ............ | H04W 72/0453 |
| 2022/0173848 A1* | 6/2022 | Guan | ............ | H04B 7/0695 |
| 2022/0225370 A1 | 7/2022 | Park et al. | | |
| 2022/0256522 A1* | 8/2022 | Matsumura | ............ | H04L 5/0023 |

OTHER PUBLICATIONS

International Search Report and Written Opinion—PCT/US2020/055530—ISA/EPO—Mar. 22, 2021.
Partial International Search Report—PCT/US2020/055530—ISA/EPO—Jan. 28, 2021.

* cited by examiner

ENABLEMENT OF SIMULTANEOUS BEAM UPDATE ACROSS COMPONENT CARRIERS

CROSS-REFERENCE TO RELATED APPLICATIONS

The present application for patent claims is a continuation of pending U.S. non-provisional patent application Ser. No. 17/069,739 filed in the United States Patent and Trademark Office on Oct. 13, 2020, and assigned to the assignee hereof and hereby expressly incorporated by reference herein as if fully set forth below in its entirety and for all applicable purposes. U.S. Non-provisional patent application Ser. No. 17/069,739 claims priority to and the benefit of U.S. Provisional Application No. 62/916,785, titled "ENABLEMENT OF SIMULTANEOUS BEAM UPDATE ACROSS MULTIPLE CCS/BWPS" filed Oct. 17, 2019, and assigned to the assignee hereof and hereby expressly incorporated by reference herein as if fully set forth below in its entirety and for all applicable purposes.

TECHNICAL FIELD

The technology discussed below relates generally to wireless communication and, more particularly, to updating beam-related information across wireless communication carriers.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) for different UEs operating within a cell of the base station.

A base station and a UE may use beamforming to enhance communication performance. For example, a transmitting device (e.g., a base station) may use multiple antennas to transmit beamformed signals to a receiving device (e.g., a UE). Here, the transmitted beamformed signals may be adjusted in phase (and, optionally, amplitude) such that the resulting signal power is focused toward the receiving device. Similarly, a receiving device may use beamforming to receive beamformed signals from a transmitting device.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a user equipment is disclosed. The method can include receiving at least one medium access control-control element (MAC-CE) including a set of transmission configuration indication state identifiers (TCI State IDs), determining whether the user equipment received information identifying a plurality of component carriers, and selectively applying the set of TCI State IDs to a single component carrier identified by the MAC-CE or to the plurality of component carriers. The selectively applying the set of TCI State IDs may be based on the determining whether the user equipment received the information identifying the plurality of component carriers. The method may also include receiving a downlink transmission via the plurality of component carriers or the single component carrier according to the selectively applying the set of TCI State IDs.

Another example provides a user equipment for a wireless communication network. The user equipment includes a transceiver configured to communicate with a radio access network, a memory, and a processor coupled to the transceiver and the memory. The processor and the memory can be configured to receive at least one medium access control-control element (MAC-CE) including a set of transmission configuration indication state identifiers (TCI State IDs) via the transceiver, determine whether the user equipment received information identifying a plurality of component carriers, and selectively apply the set of TCI State IDs to a single component carrier identified by the MAC-CE or to the plurality of component carriers. Selective application of the set of TCI State IDs may be based on the determination of whether the user equipment received the information identifying the plurality of component carriers. The processor and the memory may also be configured to receive via the transceiver a downlink transmission via the plurality of component carriers or the single component carrier according to selective application of the set of TCI State IDs.

Another example provides a user equipment for a wireless communication network. The user equipment includes means for receiving at least one medium access control-control element (MAC-CE) including a set of transmission configuration indication state identifiers (TCI State IDs), means for determining whether the user equipment received information identifying a plurality of component carriers, and means for selectively applying the set of TCI State IDs to a single component carrier identified by the MAC-CE or to the plurality of component carriers. The selectively applying the set of TCI State IDs may be based on the determining whether the user equipment received the information identifying the plurality of component carriers. The user equipment may also include means for receiving a downlink transmission via the plurality of component carriers or the single component carrier according to the selectively applying the set of TCI State IDs.

Another example provides an article of manufacture for use by a user equipment that includes a computer-readable medium having stored therein instructions executable by one or more processors of the user equipment to receive at least one medium access control-control element (MAC-CE) including a set of transmission configuration indication state identifiers (TCI State IDs), determine whether the user equipment received information identifying a plurality of component carriers, and selectively apply the set of TCI State IDs to a single component carrier identified by the MAC-CE or to the plurality of component carriers. Selective application of the set of TCI State IDs may be based on the determination of whether the user equipment received the information identifying the plurality of component carriers. The computer-readable medium may also have stored therein instructions executable by one or more processors of the user equipment to receive a downlink transmission via the plurality of component carriers or the single component carrier according to selective application of the set of TCI State IDs.

One or more of the following features may be applicable to one or more of the method, the apparatuses, and the computer-readable medium of the preceding paragraphs. A determination may be made as to whether the single component carrier indicated by the MAC-CE is a member of the plurality of component carriers. Selectively applying the set of TCI State IDs may be based on a determination of whether the single component carrier indicated by the MAC-CE is a member of the plurality of component carriers. Determining whether the single component carrier indicated by the MAC-CE is a member of the plurality of component carriers may include determining that the single component carrier indicated by the MAC-CE is a member of the plurality of component carriers. In this case, selectively applying the set of TCI State IDs may include applying the set of TCI State IDs to the plurality of component carriers. Determining whether the single component carrier indicated by the MAC-CE is a member of the plurality of component carriers may include determining that the single component carrier indicated by the MAC-CE is not a member of the plurality of component carriers. In this case, selectively applying the set of TCI State IDs may include applying the set of TCI State IDs to the single component carrier.

Another example provides a method for wireless communication at a user equipment. The method can include receiving at least one medium access control-control element (MAC-CE) including spatial relation information, determining whether the user equipment received information identifying a plurality of component carriers, and selectively applying the spatial relation information to a single component carrier identified by the MAC-CE or to the plurality of component carriers. The selectively applying the spatial relation information may be based on the determining whether the user equipment received the information identifying the plurality of component carriers. The method may also include transmitting an uplink transmission via the plurality of component carriers or the single component carrier according to the selectively applying the spatial relation information.

Another example provides a user equipment for a wireless communication network. The user equipment includes a transceiver configured to communicate with a radio access network, a memory, and a processor coupled to the transceiver and the memory. The processor and the memory can be configured to receive at least one medium access control-control element (MAC-CE) including spatial relation information via the transceiver, determine whether the user equipment received information identifying a plurality of component carriers, and selectively apply the spatial relation information to a single component carrier identified by the MAC-CE or to the plurality of component carriers. Selective application of the spatial relation information may be based on the determination of whether the user equipment received the information identifying the plurality of component carriers. The processor and the memory may also be configured to transmit via the transceiver an uplink transmission via the plurality of component carriers or the single component carrier according to selective application of the spatial relation information.

Another example provides a user equipment for a wireless communication network. The user equipment includes means for receiving at least one medium access control-control element (MAC-CE) including spatial relation information, means for determining whether the user equipment received information identifying a plurality of component carriers, and means for selectively applying the spatial relation information to a single component carrier identified by the MAC-CE or to the plurality of component carriers. The selectively applying the spatial relation information may be based on the determining whether the user equipment received the information identifying the plurality of component carriers. The user equipment may also include means for transmitting an uplink transmission via the plurality of component carriers or the single component carrier according to the selectively applying the spatial relation information.

Another example provides an article of manufacture for use by a user equipment that includes a computer-readable medium having stored therein instructions executable by one or more processors of the user equipment to receive at least one medium access control-control element (MAC-CE) including spatial relation information, determine whether the user equipment received information identifying a plurality of component carriers, and selectively apply the spatial relation information to a single component carrier identified by the MAC-CE or to the plurality of component carriers. Selective application of the spatial relation information may be based on the determination of whether the user equipment received the information identifying the plurality of component carriers. The computer-readable medium may also have stored therein instructions executable by one or more processors of the user equipment to transmit an uplink transmission via the plurality of component carriers or the single component carrier according to selective application of the spatial relation information.

One or more of the following features may be applicable to one or more of the method, the apparatuses, and the computer-readable medium of the preceding paragraphs. A determination may be made as to whether the single component carrier indicated by the MAC-CE is a member of the plurality of component carriers. Selectively applying the spatial relation information may be based on a determination of whether the single component carrier indicated by the MAC-CE is a member of the plurality of component carriers. Determining whether the single component carrier indicated by the MAC-CE is a member of the plurality of component carriers may include determining that the single component carrier indicated by the MAC-CE is a member of the plurality of component carriers. In this case, selectively applying the spatial relation information may include applying the spatial relation information to the plurality of component carriers. Determining whether the single component carrier indicated by the MAC-CE is a member of the plurality of component carriers may include determining that the single component carrier indicated by the MAC-CE is not a member of the plurality of component carriers. In this case, selectively applying the spatial relation information may include applying the spatial relation information to the single component carrier.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

DETAILED DESCRIPTION

Figure 1:
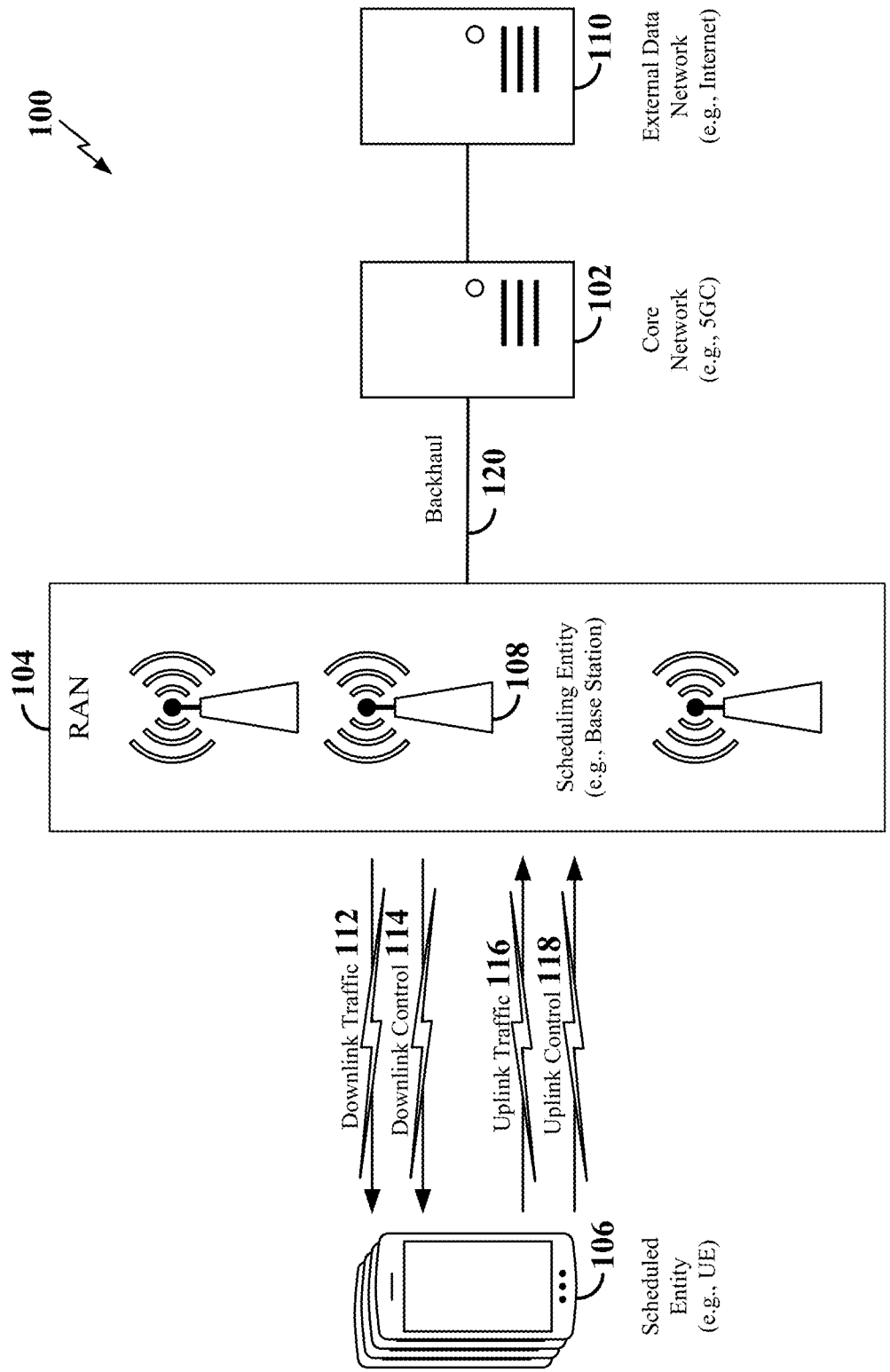
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects of the disclosure relate to wireless communication on multiple component carriers (CCs). In some examples, a user equipment (UE) may selectively apply transmission configuration indicator (TCI) information and/or spatial relation information received via a medium access control-control element (MAC-CE) to a set of component carriers.

In some examples, a UE may apply the TCI information and/or spatial relation information included in a MAC-CE to multiple component carriers if the UE has been configured with a list that includes the component carriers. For example, a base station may configure the UE with a list of component carriers that the UE may use to communicate with the base station via a radio resource control (RRC) message or another MAC-CE message.

In some examples, a UE may apply the TCI information and/or spatial relation information included in a MAC-CE to multiple component carriers if the UE has been configured with a list that includes the component carriers and if a component carrier identified by the MAC-CE is a member of the list of component carriers. Thus, in this case, the UE also compares a component carrier identifier included in the MAC-CE with component carrier identifiers included in the list of component carriers to determine whether there is a match.

The manner is which the UE applies the TCI information and/or spatial relation information included in a MAC-CE depends on whether the above condition is met (or the above conditions are met). If the condition is (conditions are) met, the UE applies the TCI information and/or spatial relation information included in a MAC-CE to the component carriers for a downlink transmission and/or an uplink transmission as applicable. If the condition is (conditions are) not met, the UE applies the TCI information and/or spatial relation information included in a MAC-CE to a single component carrier identified by the MAC-CE.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below; e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
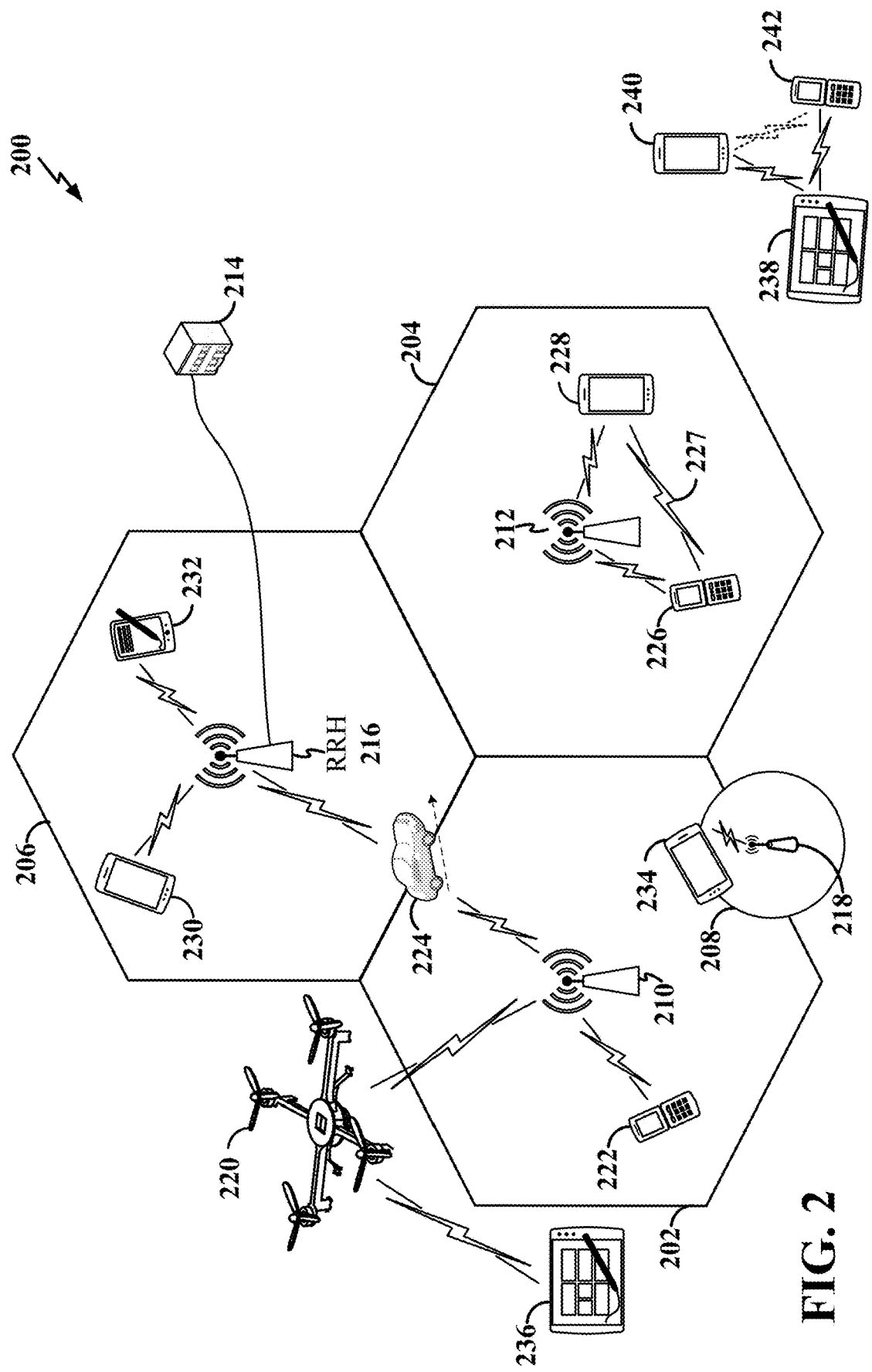
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
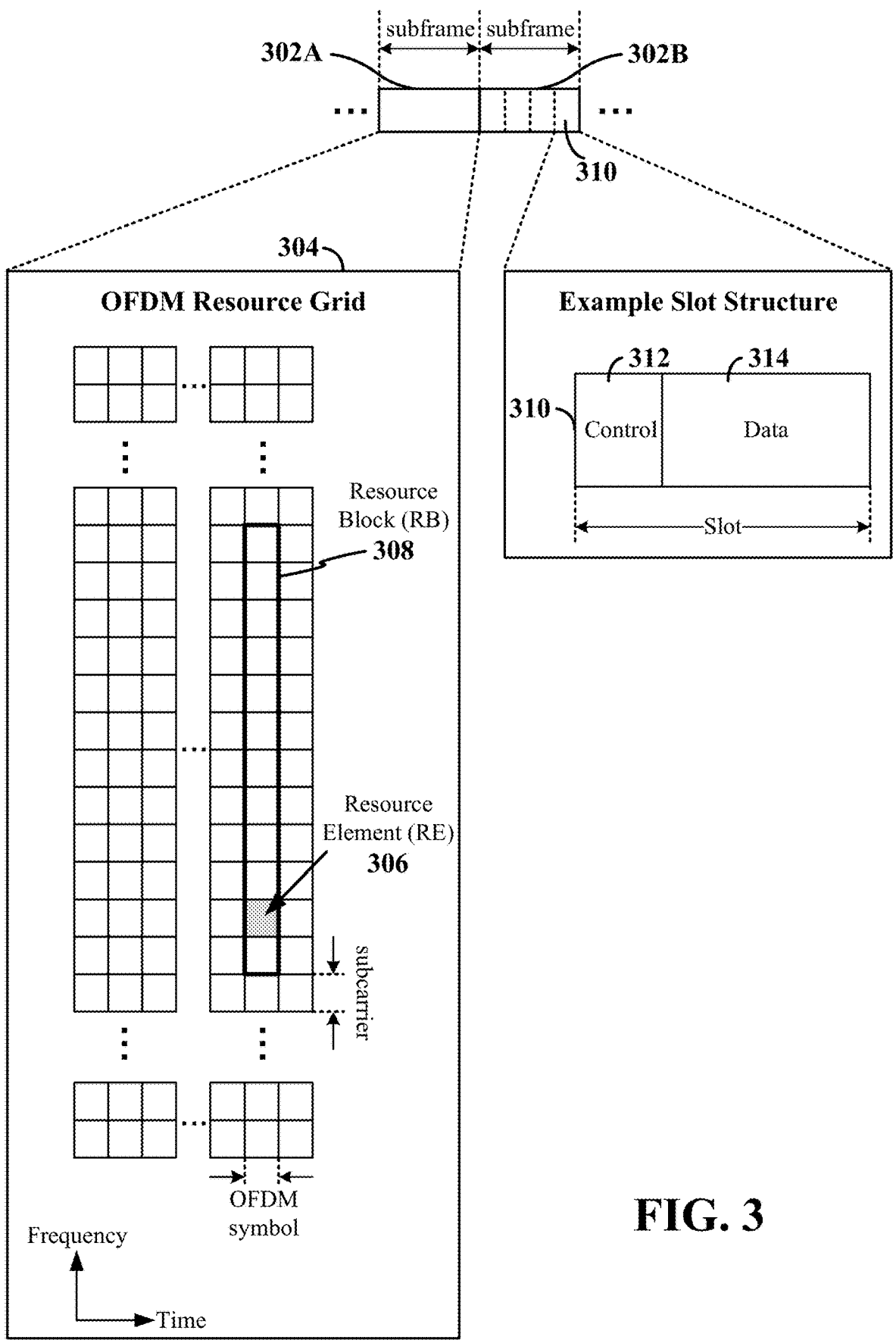
FIG. 3 is a schematic illustration of an example of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe (SF) 302A is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols; and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each BWP may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH; and/or a physical downlink control channel (PDCCH), etc., to one or more scheduled entities. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals; may include one or more supplemental channels in addition to the PBCH; may omit a PBCH; and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The PHY carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH; or for an UL transmission, a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

A transmission over the channels described above may involve the use of one or more antenna ports. An antenna port is a logical entity used to map data streams to antennas. A given antenna port may drive transmissions from one or more antennas and/or resolve signal components received over one or more antennas. An antenna port may be associated with a reference signal which may allow a receiver to distinguish data streams associated with the different antenna ports in a received transmission.

Some antenna ports may be referred to as being quasi co-located, meaning that the spatial parameters of a transmission on one antenna port may be inferred from the spatial parameters of another transmission on a different antenna port. Accordingly, a receiving device (e.g., a UE) may be able to perform channel estimation for demodulating data or control information received from a first set of antenna ports based on reference signals received from a second set of antenna ports that are quasi co-located with the first set of antenna ports. Thus, a quasi co-location (QCL) relationship between antenna ports may improve the chances that a UE may successfully decode a downlink transmission from a base station. In some cases, a base station may transmit, to a UE, an indication of which antenna ports are quasi co-located such that the UE may be able to identify additional reference signals to use for channel estimation.

In some aspects, a base station may configure a set of transmission configuration indication (TCI) states to use to indicate to a UE one or more QCL relationships between antenna ports used for transmitting downlink signals to the UE. Each TCI state may be associated with a set of reference signals (e.g., synchronization signal blocks (SSBs) or different types of channel state information reference signals (CSI-RSs)), and the TCI state may indicate a QCL relationship between antenna ports used to transmit the set of reference signals and antenna ports used to transmit data or control information to a UE. As such, when a UE receives an indication of a particular TCI state from a base station, the UE may determine that the antenna ports used to transmit the reference signals associated with the TCI state are quasi co-located with antenna ports used to transmit data and control information to the UE.

In some scenarios, the UE may use the TCI state of a coreset that was previously used to receive information. As mentioned above, a coreset may define a time-frequency resource region where the UE monitors control messages (e.g., the PDCCH). Based on QCL information in the TCI, the UE is able to determine how to receive a beamformed transmission from a base station (e.g., a gNB). For example, the QCL information may indicate which beam to use, which direction to point a beam, and what filters to use for channel estimation. Thus, the QCL information may enable the UE to determine how to receive a current transmission (e.g., a PDSCH) based on parameters the UE used to receive a prior transmission (e.g., using a prior coreset).

To limit the overhead associated with indicating a TCI state to a UE, a base station may be configured to indicate a limited number of TCI states to a UE. For example, the base station may configure M (e.g., 8) TCI states corresponding to different QCL relationships between antenna ports used for downlink communication with a UE, and the base station may use an N-bit indicator (e.g., a 3-bit indicator) to indicate a TCI state to a UE (e.g., where M≥2 N). In some cases, however, after a period of time, the originally configured TCI states may no longer correspond to suitable QCL relationships between antenna ports used for transmitting downlink signals to a UE. In such cases, a base station may be configured to use radio resource control (RRC) signaling or a medium access control (MAC) control element (MAC-CE) to update the TCI states used to indicate QCL relationships between antenna ports to a UE.

A TCI state associated with a transmission/channel provides quasi-colocation (QCL) information about the antenna ports a base station (BS) uses for the transmission. This QCL information may therefore include information indicative of the beam the UE may use to decode the transmission. A UE may use the beam configuration specified by the TCI or the UE may use a default beam configuration in certain scenarios. TCI state information may be referred to herein as a TCI state identifier (TCI State ID).

Figure 4:
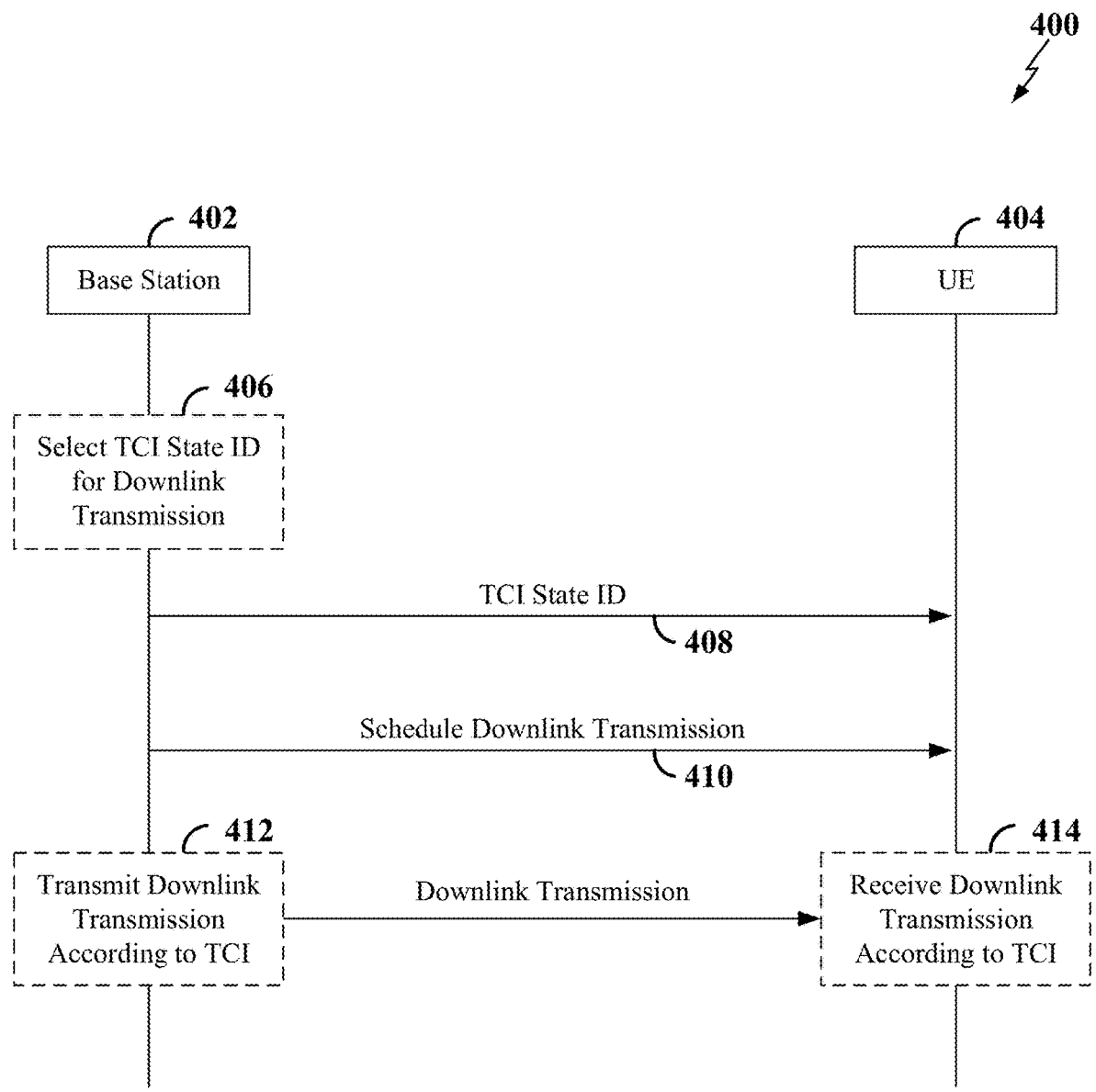
FIG. 4 is a signaling diagram illustrating an example of signaling for a downlink transmission according to some aspects.

FIG. 4 is a signaling diagram 400 illustrating an example of signaling a TCI State ID and scheduling a downlink transmission in a wireless communication system including a base station (BS) 402 and a UE 404. In some examples, the BS 402 may correspond to any of the base stations or scheduling entities shown in any of FIGS. 1, 2, 5, 6, 8, and 9. In some examples, the UE 404 may correspond to any of the UEs or scheduled entities shown in any of FIGS. 1, 2, 5, 6, 8, 9, and 10.

At step 406 of FIG. 4, the BS 402 selects a TCI that the BS 402 will use to transmit a downlink transmission. As mentioned above, the UE 404 may use a TCI state (indicated by a TCI State ID) configured and activated by the BS 402 to determine the downlink transmit beam that the BS 402 is using for the downlink transmission.

Thus, at step 408, the BS 402 transmits the corresponding TCI State ID to the UE 404. For example, the BS 402 may transmit the TCI State ID via a MAC-CE or some other type of signaling.

At step 410, the BS 402 schedules the downlink transmission (e.g., a PDSCH transmission). For example, the BS 402 may send a DCI to the UE 404 via a downlink control channel (e.g., a PDCCH) to schedule the downlink transmission to the UE 404. The DCI may indicate the resources and other parameters to be used by the BS 402 for the downlink transmission.

At step 412, the BS 402 transmits the downlink transmission on the scheduled resources. Here, the BS 402 may use a particular transmit beam configuration based on the TCI selected at step 406.

At step 414, the UE 404 receives the downlink transmission on the scheduled resources. Here, the UE 404 may use a particular receive beam configuration based on the TCI State ID received at step 408.

For an uplink transmission, a base station may configure a UE with spatial relation information. The UE uses the spatial relation information to determine the transmit beam to use for the uplink transmission. In some examples, spatial relation information may be referred to as an uplink TCI.

Figure 5:
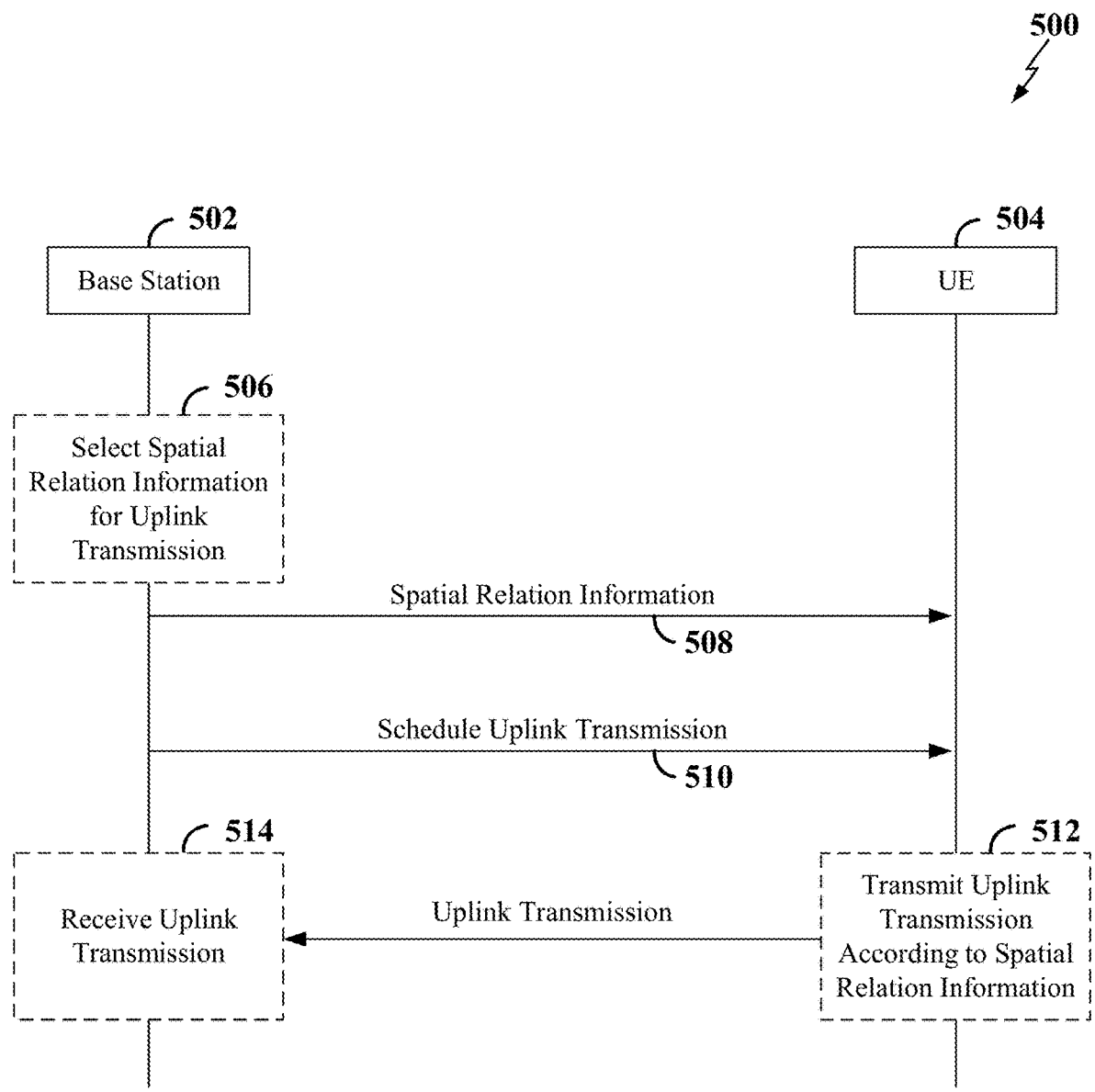
FIG. 5 is a signaling diagram illustrating an example of signaling for an uplink transmission according to some aspects.

FIG. 5 is a signaling diagram 500 illustrating an example of signaling spatial relation information and scheduling an uplink transmission in a wireless communication system including a base station (BS) 502 and a UE 504. In some examples, the BS 502 may correspond to any of the base stations or scheduling entities shown in any of FIGS. 1, 2, 4, 6, 8, and 9. In some examples, the UE 504 may correspond to any of the UEs or scheduled entities shown in any of FIGS. 1, 2, 4, 6, 8, 9, and 10.

At step 506 of FIG. 5, the BS 502 selects spatial relation information for the UE 504 to use to transmit an uplink transmission. In some aspects, spatial relation information may specify a filter to be applied to generate an uplink beam in a desired direction and with a desired beam width. In some examples, a spatial relation for a transmission may be configured based on a reference signal (RS). Here, a set of spatial relation information may be defined for an RS. Then, the spatial relation information for a transmission may be selected from the set of spatial relation information defined for the RS. In some examples, an RS may be an SSB, a CSI-RS, or an SRS.

At step 508, the BS 502 transmits the spatial relation information selected at step 506 to the UE 504. For example, the BS 502 may transmit the spatial relation information via a MAC-CE or some other type of signaling.

At step 510, the BS 502 schedules the uplink transmission (e.g., a PUSCH transmission). For example, the BS 502 may send a DCI to the UE 504 via a downlink control channel (e.g., a PDCCH) to schedule the uplink transmission to the UE 504. The DCI may indicate the resources and other parameters to be used by the UE 504 for the uplink transmission.

At step 512, the UE 504 transmits the uplink transmission on the scheduled resources. Here, the UE 504 may use a particular transmit beam configuration based on the spatial relation information received at step 508. The BS 502 receives the uplink transmission on the scheduled resources at step 514.

A base station may transmit parallel data streams over respective antennas to increase throughput (e.g., as opposed to transmitting the data streams sequentially over the same antenna). Additionally, or alternatively, a base station may simultaneously transmit a given data stream over multiple antennas (e.g., to increase the diversity of the transmissions).

5G-NR networks may support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a cell. In some aspects, the term carrier may refer to a carrier frequency (or band) utilized for communication within a cell.

Figure 6:
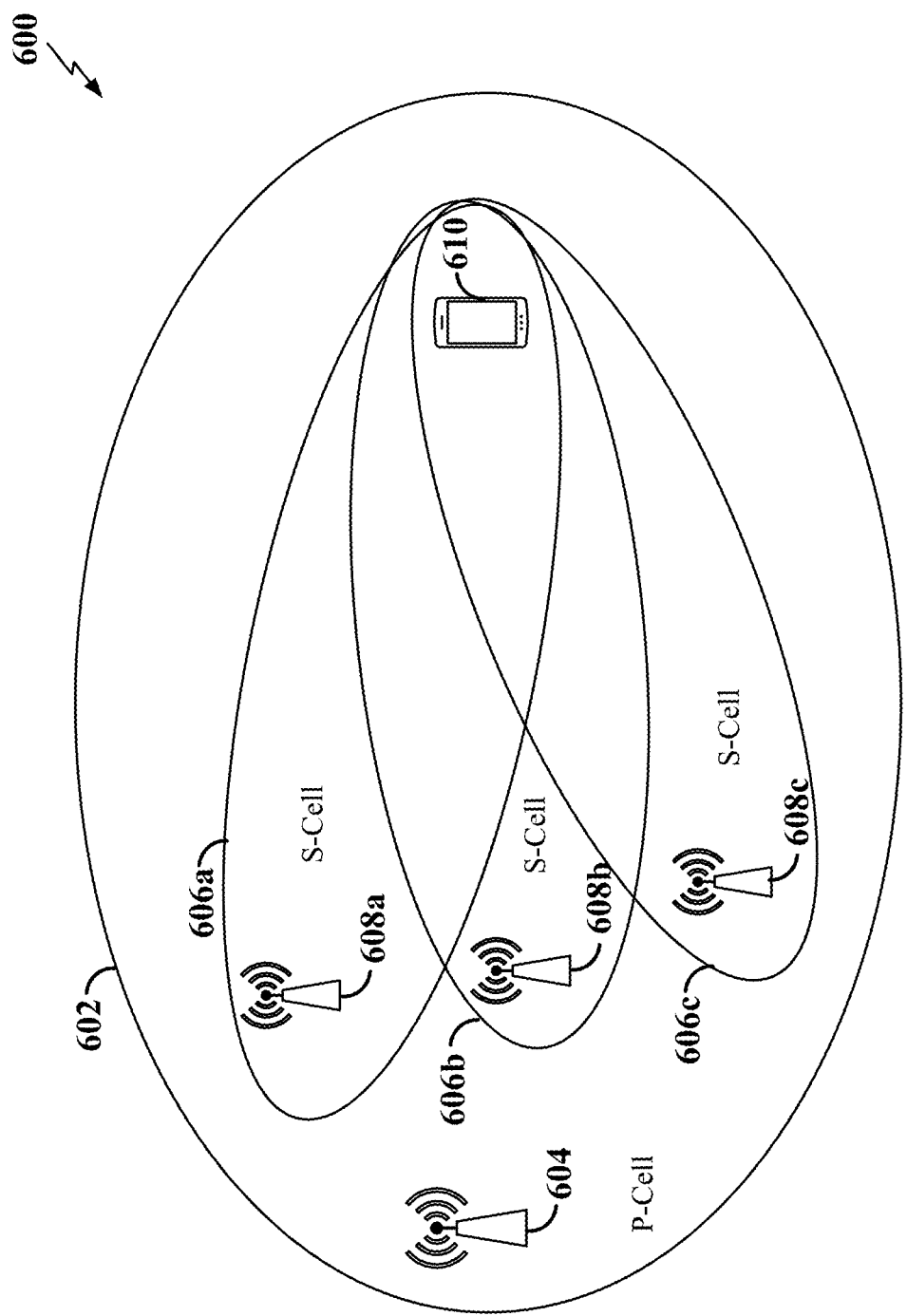
FIG. 6 is a conceptual illustration of an example of wireless communication via multiple radio frequency (RF) carriers according to some aspects.

FIG. 6 is a conceptual illustration of a wireless communication system that shows a base station (BS) and a user equipment (UE) communicating via multiple carriers according to some aspects of the disclosure. In particular, FIG. 6 shows an example of a wireless communication system 600 that includes a primary serving cell (PCell) 602 and one or more secondary serving cells (SCells) 606a, 606b, and 606c. The PCell 602 may be referred to as the anchor cell that provides a radio resource control (RRC) connection to a UE 610. In some examples, the PCell and the SCell may be co-located (e.g., different TRPs at the same location).

One or more of the SCells 606a-606c may be activated or added to the PCell 602 to form the serving cells serving the UE 610. Each serving cell corresponds to a component carrier (CC). The CC of the PCell 602 may be referred to as a primary CC, and the CC of a SCell 606a-606c may be referred to as a secondary CC. The PCell 602 and one or more of the SCells 606 may be served by a respective base station 604 and 608a-608c or scheduling entity similar to those illustrated in any of FIGS. 1, 2, 4, 5, 8, and 9. In the example shown in FIG. 6, SCells 606a-606c are each served by a respective base station 608a-608c or TRPs of the base station 604, each supporting a different carrier.

In some examples, the PCell 602 may utilize a first radio access technology (RAT), such as LTE, while one or more of the SCells 606 may utilize a second RAT, such as 5G-NR. In this example, the multi-cell transmission environment may be referred to as a multi-RAT-dual connectivity (MR-DC) environment. One example of MR-DC is Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

In some examples, the PCell 602 may be a low band cell, and the SCells 606 may be high band cells. A low band (LB) cell uses a component carrier in a frequency band lower than that of the high band cells. For example, the high band cells may use millimeter wave (mmW) component carriers, and the low band cell may use a component carrier in a band (e.g., sub-6 GHz band) lower than mmW. In general, a cell using a mmW component carrier can provide greater bandwidth than a cell using a low band component carrier. In addition, when using a frequency carrier that is above 6 GHz (e.g., mmW), beamforming may be used to transmit and receive signals in some examples.

The disclosure relates in some aspects to selectively applying a beam-related configuration in a multiple carrier wireless communication environment. For example, a UE may determine, based on whether a list of component carriers (CCs) is configured, whether to use configuration information received via a MAC-CE for a set of component carriers (e.g., all of the component carriers identified by the list) or only for a component carrier identified by the MAC-CE. As another example, a UE may determine, based on whether a list of component carriers is configured and whether a component carrier identified by the MAC-CE is a member of the list of component carriers, whether to use configuration information received via a MAC-CE for a set of component carriers (e.g., all of the component carriers identified by the list) or only for a component carrier identified by the MAC-CE. In some examples, the configuration information may include a set of TCI State IDs and/or spatial relation information.

In some examples, a single MAC-CE may simultaneously update the same set of TCI State IDs or spatial relation information (Spatial Relation Info) across multiple CCs/BWPs, indicated by an applicable list of component carriers configured by RRC signaling. In some examples, when a set of TCI-state IDs for PDSCH are activated by a MAC CE for a set of CCs/BWPs at least for the same band, where the applicable list of component carriers is indicated by RRC signaling, the same set of TCI-state IDs are applied for all the BWPs in the indicated component carriers.

In some examples, when a TCI-state ID is activated for a coreset by a MAC-CE for a set of CCs/BWPs at least for the same band, where the applicable list of component carriers is indicated by RRC signaling, the TCI-state ID is applied for the coresets(s) with the same coreset ID for all BWPs in the indicated component carriers.

In some examples, when a Spatial Relation Info is activated for a semi-persistent (SP) or aperiodic (AP) SRS resource by a MAC-CE for a set of CCs/BWPs at least for the same band, where the applicable list of component carriers is indicated by RRC signaling, the Spatial Relation Info is applied for the SP/AP SRS resource(s) with the same SRS resource ID for all BWPs in the indicated component carriers.

The selective application of a TCI State ID and/or spatial relation information may be applicable to various scenarios. In some examples, this technique may be used with inter-band carrier aggregation (e.g., where the TCI State ID and/or spatial relation information is selectively applied to the inter-band carriers). In some examples, this technique may be used with a single TRP. Different combinations of component carriers can be configured by RRC signaling and different UE capabilities may be supported. In some examples, an applicable list of bands on which this technique is to be applied may be signaled by the MAC-CE that activates the same set of PDSCH TCI State IDs for multiple CCs/BWPs.

The disclosure relates in some aspects, to indicating (e.g., signaling) the feature that a single MAC-CE will simultaneously update the same set of TCI State IDs or spatial relation information across multiple CCs/BWPs. In some aspects, this feature is indicated by an applicable list of component carriers. This list may be configured by RRC signaling, MAC-CE signaling, or some other type of signaling.

In some examples, if the applicable list (or some other list of component carriers) is configured, the selective application of a TCI State ID and/or spatial relation information feature is enabled. In some examples, if the applicable list (or some other list of component carriers) is configured and if a CC identified by the MAC-CE is a member of the list of CCs, the selective application of a TCI State ID and/or spatial relation information feature is enabled. In either example, the same set of TCI State IDs or spatial relation information indicated by the single MAC-CE are applied to all CCs/BWPs in the applicable list.

If the above condition is not met (or the above conditions are not met), the selective application of a TCI State ID and/or spatial relation information feature is disabled. That is, the set of TCI State IDs or spatial relation information is only applied to the CC/BWP indicated by the MAC-CE.

In some examples, the following may be applicable. A MAC-CE may include a Serving Cell ID field. This field indicates the identity of the Serving Cell for which the MAC CE applies. The length of the field is 5 bits. If the indicated Serving Cell is configured as part of a simultaneousTCI-UpdateList1-r16 or simultaneousTCI-UpdateList2-r16, this MAC CE applies to all the Serving Cells configured in the set simultaneousTCI-UpdateList1-r16 or simultaneousTCI-UpdateList2-r16, respectively.

In some examples, the list of component carriers (serving cells) may be indicated by a simultaneousTCI-UpdateList1 or a simultaneousTCI-UpdateList2. The simultaneousSpatial-UpdatedList1 or the simultaneousSpatial-UpdatedList2 may be a list of serving cells which can be updated simultaneously for TCI relation with a MAC CE. The simultaneousTCI-UpdateList1 and simultaneousTCI-UpdateList2 shall not contain same serving cells. The network should not configure serving cells that are configured with CORESETPoolID=1 in these lists.

In some examples, the list of component carriers (serving cells) may be indicated by a simultaneousSpatial-UpdatedList1 or a simultaneousSpatial-UpdatedList2. The simultaneousSpatial-UpdatedList1 or the simultaneousSpatial-UpdatedList2 may be a list of serving cells which can be updated simultaneously for spatial relation with a MAC CE. The simultaneousSpatial-UpdatedList1 and simultaneousSpatial-UpdatedList2 shall not contain same serving cells. The network should not configure serving cells that are configured with CORESETPoolID=1 in these lists.

In some examples, the following may be applicable. The UE receives an activation command, used to map up to 8 TCI states to the codepoints of the DCI field 'Transmission Configuration Indication' in one CC/DL BWP or in a set of CCs/DL BWPs, respectively. When a set of TCI State IDs are activated for a set of CCs/DL BWPs, where the applicable list of CCs is determined by indicated CC in the activation command, the same set of TCI State IDs are applied for all DL BWPs in the indicated CCs.

Thus, in some examples, a UE may receive a MAC-CE that includes a set of TCI State IDs or spatial relation information (e.g., UE receives an activation command) In addition, the UE may determine whether the UE received information identifying a plurality of component carriers (e.g., simultaneousTCI-UpdateList1-r16 or simultaneousTCI-UpdateList2-r16). In some examples, the UE may selectively apply the set of TCI State IDs or the spatial relation information to the plurality of component carriers based on the user equipment received the information identifying the plurality of component carriers (e.g., MAC CE applies to all the Serving Cells configured in the set simultaneousTCI-UpdateList1-r16 or simultaneousTCI-UpdateList2-r16). In some examples, the UE may selectively apply the set of TCI State IDs or the spatial relation information to the plurality of component carriers based on whether the user equipment received the information identifying the plurality of component carriers and whether the single component carrier indicated by the MAC-CE is a member of the identified plurality of component carriers (e.g., if the indicated Serving Cell is configured as part of a simultaneousTCI-UpdateList1-r16 or a simultaneousTCI-UpdateList2-r16, this MAC CE applies to all the Serving Cells configured in the set simultaneousTCI-UpdateList1-r16 or simultaneousTCI-UpdateList2-r16).

Figure 7:
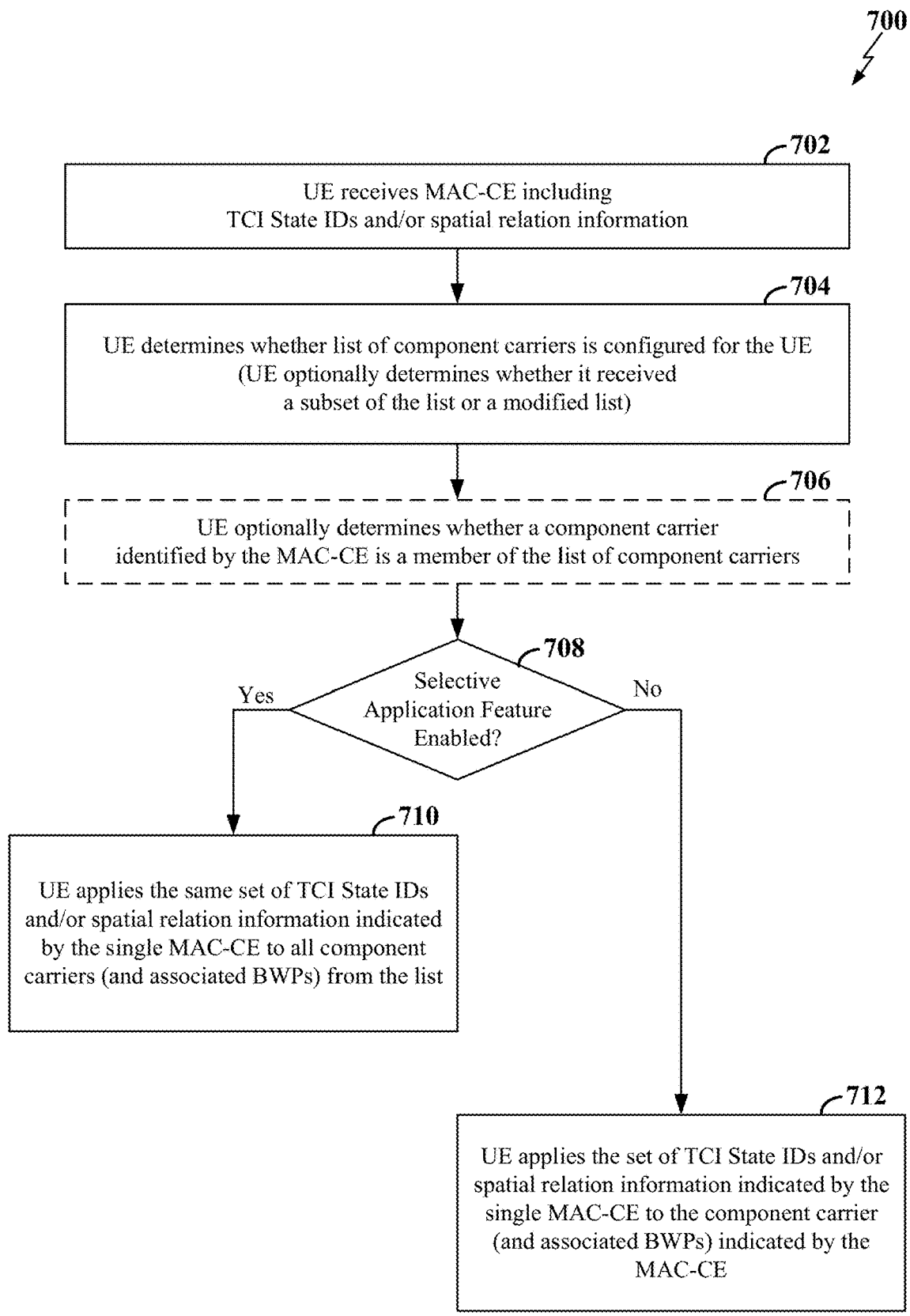
FIG. 7 is a flow chart illustrating an example of a process for selectively applying beam-related configuration information according to some aspects.

FIG. 7 is a flow chart illustrating an example process 700 for selective application of TCI State IDs and/or spatial relation information according to some aspects. As described below, some or all illustrated features may be omitted in a particular implementation within the scope of the present disclosure, and some illustrated features may not be required for implementation of all embodiments. In some examples, the process 700 may be carried out by the UE 1000 illustrated in FIG. 10. In some examples, the process 700 may be carried out by any suitable apparatus or means for carrying out the functions or algorithm described below.

At block 702, a UE receives a MAC-CE including TCI State IDs and/or spatial relation information.

At block 704, the UE determines whether a list of component carriers (serving cells) is configured for the UE. For example, the UE may determine whether it has been configured with a simultaneousTCI-UpdateList1-r16 or a simultaneousTCI-UpdateList2-r16. In some aspects, this operation may involve determining whether the UE received information that identifies a subset of the component carriers of a list of component carriers. For example, the UE may receive this subset information via a MAC-CE. In some aspects, a MAC-CE may indicate an update or modification of a list of component carriers indicated by RRC signaling.

At optional block 706, the UE may also determine whether a component carrier identified by the MAC-CE is a member of the list of component carriers.

At block 708, if selective application of the TCI State IDs and/or spatial relation information is enabled (e.g., if the list of component carriers is configured and, optionally, if the component carrier identified by the MAC-CE is a member of the list of component carriers), the operational flow proceeds to block 710, otherwise, the operational flow proceeds to block 712.

At block 710, the UE applies the same set of TCI State IDs and/or spatial relation information indicated by the single MAC-CE to all component carriers (e.g., and associated BWPs) from the list.

At block 712, the UE applies the set of TCI State IDs and/or spatial relation information indicated by the single MAC-CE to the component carrier (e.g., and associated BWPs) indicated by the MAC-CE.

Figure 8:
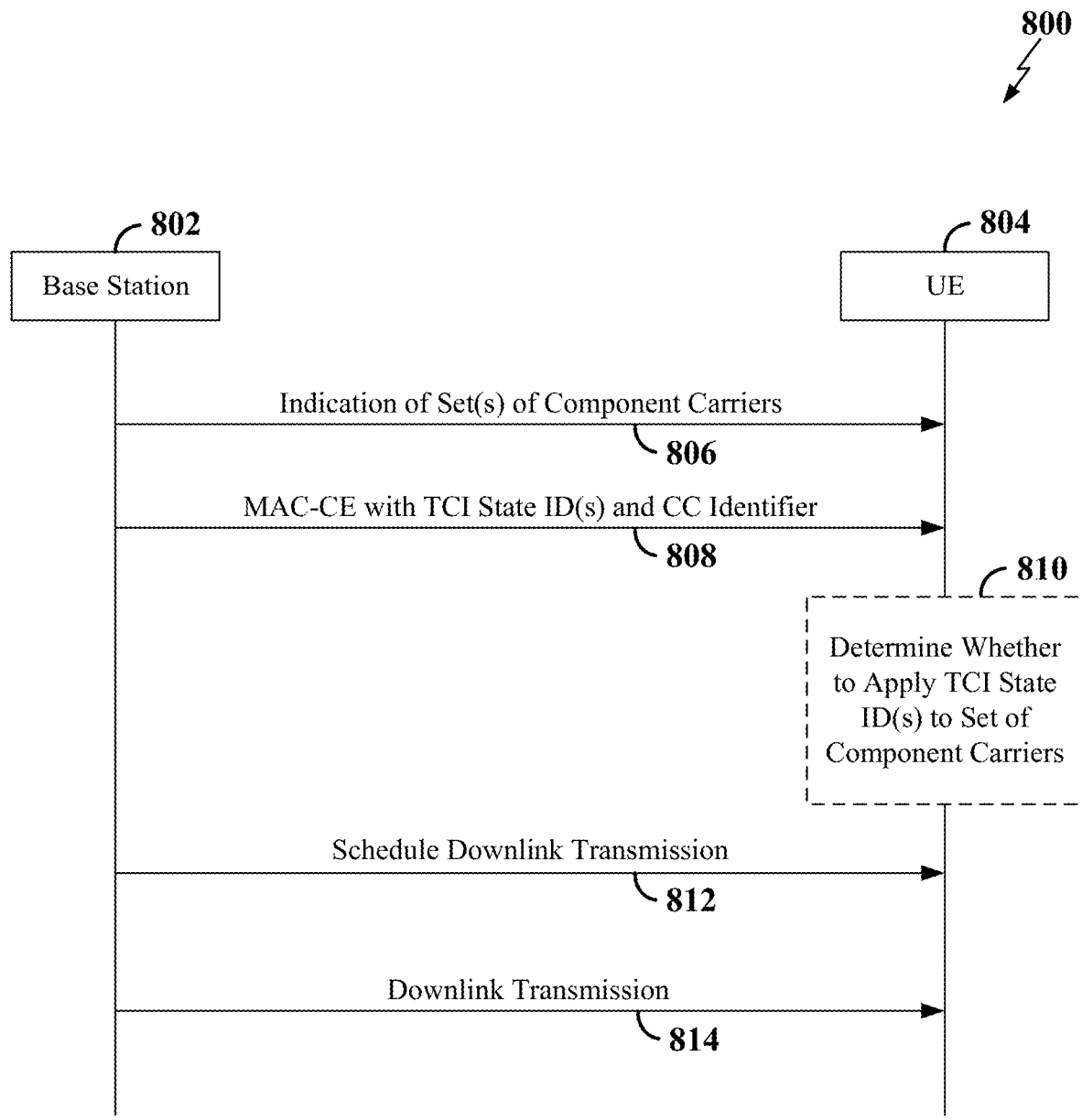
FIG. 8 is a signaling diagram illustrating an example of signaling for selectively applying a transmission configuration indicator (TCI) for a downlink transmission according to some aspects.

FIG. 8 is a signaling diagram 800 illustrating an example of selective application of a TCI State ID (e.g., as described in FIG. 7) in a wireless communication system including a base station (BS) 802 and a UE 804. In some examples, the BS 802 may correspond to any of the base stations or scheduling entities shown in any of FIGS. 1, 2, 4, 5, 6, and 9. In some examples, the UE 804 may correspond to any of the UEs or scheduled entities shown in any of FIGS. 1, 2, 4, 5, 6, 9, and 10.

At optional step 806 of FIG. 8, the BS 802 may send an indication of one or more sets of component carriers to the UE 804. For example, the BS 802 may transmit an RRC message that identifies several lists of component carriers.

At step 808, the BS 802 sends a MAC-CE to the UE 804. The MAC-CE includes at least one TCI State ID and an identifier of a component carrier. In some examples, the component carrier indicated by the MAC-CE is the serving cell for which the MAC-CE applies.

At step 810, the UE 804 determines whether to apply the TCI State ID(s) to a set of component carriers. In some examples, the UE 804 will apply the TCI State ID(s) to a set of component carriers if a set of component carriers was indicated at step 806. In some examples, the UE 804 may apply the TCI State ID(s) to a set of component carriers if a set of component carriers was indicated at step 806 and if the component carrier identifier in the MAC-CE of step 808 is one of the component carrier identifiers in the indicated set of component carriers. Otherwise, the UE 804 may apply the TCI State ID(s) only to the component carrier identified by the MAC-CE.

At step 814, the BS 802 schedules a downlink transmission to the UE 804. The BS 802 then transmits the downlink transmission at step 814. As discussed herein, depending on the result of the determination of step 810, to receive the downlink transmission, the UE 804 either applies the TCI State ID(s) to the single component carrier identified by the MAC-CE or applies the TCI State ID(s) to a set of component carriers.

Figure 9:
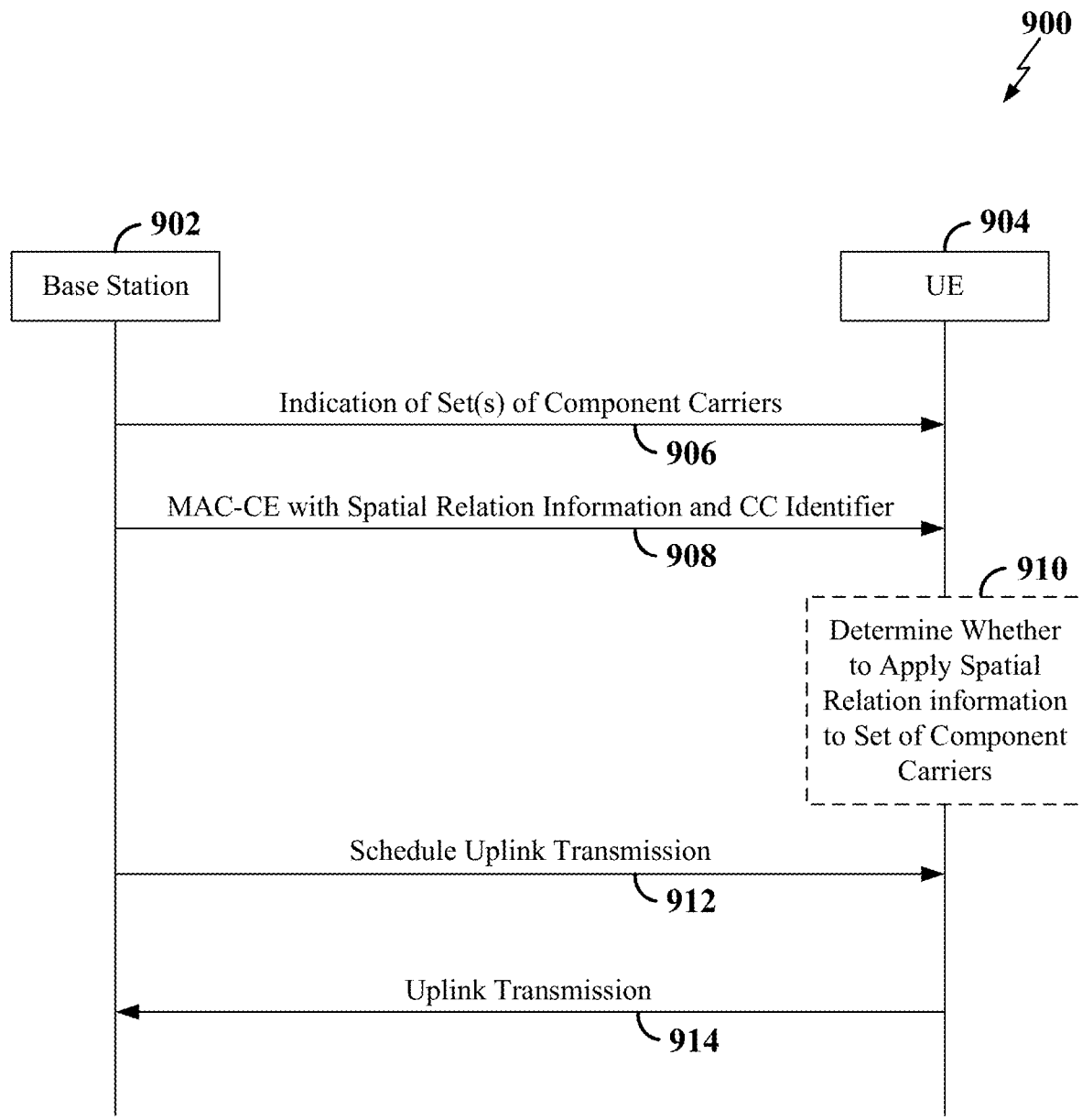
FIG. 9 is a signaling diagram illustrating an example of signaling for selectively applying spatial relation information for an uplink transmission according to some aspects.

FIG. 9 is a signaling diagram 900 illustrating an example of selective application of spatial relation information (e.g., as described in FIG. 7) a wireless communication system including a base station (BS) 902 and a UE 904. In some examples, the BS 902 may correspond to any of the base stations or scheduling entities shown in any of FIGS. 1, 2, 4, 5, 6, and 8. In some examples, the UE 904 may correspond to any of the UEs or scheduled entities shown in any of FIGS. 1, 2, 4, 5, 6, 8, and 10.

At optional step 906 of FIG. 9, the BS 902 may send an indication of one or more sets of component carriers to the UE 904. For example, the BS 902 may transmit an RRC message that identifies several lists of component carriers.

At step 908, the BS 902 sends a MAC-CE to the UE 904. The MAC-CE includes spatial relation information and an identifier of a component carrier. In some examples, the component carrier indicated by the MAC-CE is the serving cell for which the MAC-CE applies.

At step 910, the UE 904 determines whether to apply the spatial relation information to a set of component carriers. In some examples, the UE 904 will apply the spatial relation information to a set of component carriers if a set of component carriers was indicated at step 906. In some examples, the UE 904 will apply the spatial relation information to a set of component carriers if a set of component carriers was indicated at step 906 and if the component carrier identifier in the MAC-CE of step 908 is one of the component carrier identifiers in the indicated set of component carriers. Otherwise, the UE 904 may apply the spatial relation information only to the component carrier identified by the MAC-CE.

At step 914, the BS 902 schedules an uplink transmission by the UE 904. The UE 904 then transmits the uplink transmission at step 914. As discussed herein, depending on the result of the determination of step 910, to transmit the uplink transmission, the UE 904 either applies the spatial relation information to the single component carrier identified by the MAC-CE or applies the spatial relation information to a set of component carriers.

Figure 10:
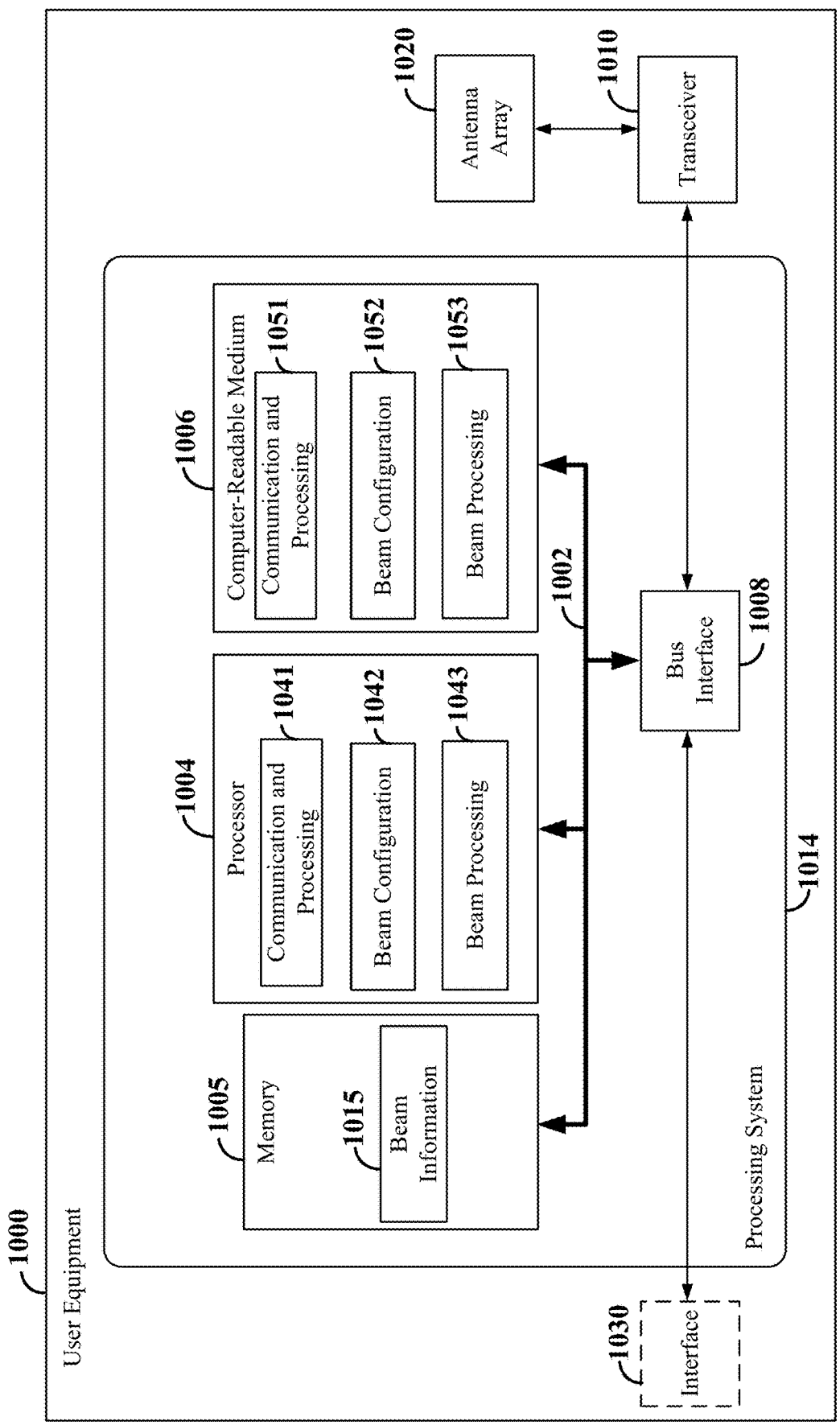
FIG. 10 is a block diagram illustrating an example of a hardware implementation for a user equipment employing a processing system according to some aspects.

FIG. 10 is a block diagram illustrating an example of a hardware implementation for a UE 1000 employing a processing system 1014. For example, the UE 1000 may be a device configured to wirelessly communicate with a base station, as discussed in any one or more of FIGS. 1-9. In some implementations, the UE 1000 may correspond to any of the UEs or scheduled entities shown in any of FIGS. 1, 2, 4, 5, 6, 8, and 9.

In accordance with various aspects of the disclosure, an element, or any portion of an element, or any combination of elements may be implemented with the processing system 1014. The processing system 1014 may include one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described herein.

The processor 1004 may in some instances be implemented via a baseband or modem chip and in other implementations, the processor 1004 may include a number of devices distinct and different from a baseband or modem chip (e.g., in such scenarios as may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010 and between the bus 1002 and an interface 1030. The transceiver 1010 provides a communication interface or means for communicating with various other apparatus over a wireless transmission medium. In some examples, the UE may include two or more transceivers 1010, each configured to communicate with a respective network type (e.g., terrestrial or non-terrestrial). The interface 1030 provides a communication interface or means of communicating with various other apparatuses and devices (e.g., other devices housed within the same apparatus as the UE or other external apparatuses) over an internal bus or external transmission medium, such as an Ethernet cable. Depending upon the nature of the apparatus, the interface 1030 may include a user interface (e.g., keypad, display, speaker, microphone, joystick). Of course, such a user interface is optional, and may be omitted in some examples, such as an IoT device.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software. For example, the memory 1005 may store beam information 1015 (e.g., parameters for beamforming) used by the processor 1004 in cooperation with the transceiver 1010 to transmit uplink information.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1000 may be configured to perform any one or more of the operations described herein (e.g., as described above in conjunction with FIGS. 1-9 and as described below in conjunction with FIGS. 11-14). In some aspects of the disclosure, the processor 1004, as utilized in the UE 1000, may include circuitry configured for various functions.

The processor 1004 may include communication and processing circuitry 1041. The communication and processing circuitry 1041 may be configured to communicate with a base station, such as a gNB. The communication and processing circuitry 1041 may include one or more hardware components that provide the physical structure that performs various processes related to wireless communication (e.g., signal reception and/or signal transmission) as described herein. The communication and processing circuitry 1041 may further include one or more hardware components that provide the physical structure that performs various processes related to signal processing (e.g., processing a received signal and/or processing a signal for transmission) as described herein. In some examples, the communication and processing circuitry 1041 may include two or more transmit/receive chains, each configured to process signals in a different RAT (or RAN) type. The communication and processing circuitry 1041 may further be configured to execute communication and processing software 1051 included on the computer-readable medium 1006 to implement one or more functions described herein.

In some examples, the communication and processing circuitry 1041 may be configured to receive and process downlink beamformed signals at a mmWave frequency or a sub-6 GHz frequency via the transceiver 1010 and an antenna array 1020. For example, the communication and processing circuitry 1041 may be configured to receive a respective reference signal (e.g., SSB or CSI-RS) on each of a plurality of downlink beams from the base station during a downlink beam sweep via at least one first antenna panel of the antenna array 1020. The communication and processing circuitry 1041 may further be configured to transmit a beam measurement report to the base station.

In some examples, the communication and processing circuitry 1041 may further be configured to generate and transmit uplink beamformed signals at a mmWave frequency or a sub-6 GHz frequency via the transceiver 1010 and the antenna array 1020. For example, the communication and processing circuitry 1041 may be configured to transmit a respective reference signal (e.g., SRS or DMRS) on each of a plurality of uplink beams to the base station during an uplink beam sweep via at least one second antenna panel of the antenna array 1020.

The communication and processing circuitry 1041 may further be configured to generate and transmit a request to the base station. For example, the request may be included in a MAC-CE carried in a PUSCH, UCI in a PUCCH or PUSCH, a random access message, or an RRC message. The communication and processing circuitry 1041 may further be configured to generate and transmit a scheduling request (e.g., via UCI in a PUCCH) to the base station to receive an uplink grant for a PUSCH.

The communication and processing circuitry 1041 may further be configured to generate and transmit an uplink signal on one or more uplink transmit beams applied to the uplink signal. The uplink signal may include, for example, a PUCCH, PUSCH, SRS, DMRS, or PRACH.

The communication and processing circuitry 1041 may further be configured to control the antenna array 1020 and the transceiver 1010 to search for and identify a plurality of downlink transmit beams during a downlink beam sweep. The communication and processing circuitry 1041 may further be configured to obtain a plurality of beam measurements on each of a plurality of downlink receive beams via the antenna array 1020 for each of the identified downlink transmit beams. The communication and processing circuitry 1041 may further be configured to generate a beam measurement report for transmission to the base station using the transceiver 1010.

The communication and processing circuitry 1041 may further be configured to identify one or more selected uplink beam(s) based on the beam measurements obtained from the downlink beam reference signals. In some examples, the communication and processing circuitry 1041 may be configured to compare the respective reference signal received power (RSRP) or other beam measurement measured on each of the downlink receive beams for each of the serving downlink transmit beams to identify the serving downlink receive beams and to further utilize the serving downlink receive beams as the selected uplink transmit beams. Each serving downlink receive beam may have the highest measured RSRP (or other beam measurement) for one of the downlink transmit beams.

The communication and processing circuitry 1041 may be configured to generate one or more uplink transmit beams for transmission in an uplink beam sweep. Each uplink transmit beam may carry an uplink reference signal (e.g., an SRS) for measurement by the base station. The communication and processing circuitry 1041 may further be configured to identify the selected uplink transmit beam(s) selected by the base station based on the uplink beam measurements. For example, the communication and processing circuitry 1041 may be configured to receive an indication of the selected uplink transmit beam(s) from the base station.

In some implementations where the communication involves receiving information, the communication and processing circuitry 1041 may obtain information from a component of the UE 1000 (e.g., from the transceiver 1010 that receives the information via radio frequency signaling or some other type of signaling suitable for the applicable communication medium), process (e.g., decode) the information, and output the processed information. For example, the communication and processing circuitry 1041 may output the information to another component of the processor 1004, to the memory 1005, or to the bus interface 1008. In some examples, the communication and processing circuitry 1041 may receive one or more of signals, messages, other information, or any combination thereof. In some examples, the communication and processing circuitry 1041 may receive information via one or more channels. In some examples, the communication and processing circuitry 1041 may include functionality for a means for receiving. In some examples, the communication and processing circuitry 1041 may include functionality for a means for decoding.

In some implementations where the communication involves sending (e.g., transmitting) information, the communication and processing circuitry 1041 may obtain information (e.g., from another component of the processor 1004, the memory 1005, or the bus interface 1008), process (e.g., encode) the information, and output the processed information. For example, the communication and processing circuitry 1041 may output the information to the transceiver 1010 (e.g., that transmits the information via radio frequency signaling or some other type of signaling suitable for the applicable communication medium). In some examples, the communication and processing circuitry 1041 may send one or more of signals, messages, other information, or any combination thereof. In some examples, the communication and processing circuitry 1041 may send information via one or more channels. In some examples, the communication and processing circuitry 1041 may include functionality for a means for sending (e.g., a means for transmitting). In some examples, the communication and processing circuitry 1041 may include functionality for a means for encoding.

The processor 1004 may include beam configuration circuitry 1042 configured to perform beam configuration-related operations as discussed herein (e.g., one or more of the operations described in conjunction with FIGS. 7-9). The beam configuration circuitry 1042 may include functionality for a means for receiving a MAC-CE (e.g., as described at step 808 of FIG. 8 and/or step 908 of FIG. 9 and/or block 1102 of FIG. 11 and/or block 1202 of FIG. 12 and/or block 1302 of FIG. 13 and/or block 1402 of FIG. 14). The beam configuration circuitry 1042 may include functionality for a means for determining whether information identifying component carriers has been received (e.g., as described at steps 806 and 810 of FIG. 8 and/or steps 906 and 910 of FIG. 9 and/or block 1104 of FIG. 11 and/or block 1204 of FIG. 12 and/or block 1304 of FIG. 13 and/or block 1404 of FIG. 14). The beam configuration circuitry 1042 may include functionality for a means for determining whether a component carrier indicated by a MAC-CE is one of a set of component carriers (e.g., as described at step 810 of FIG. 8 and/or step 910 of FIG. 9 and/or block 1206 of FIG. 12 and/or block 1406 of FIG. 14). The beam configuration circuitry 1042 may further be configured to execute beam configuration software 1052 included on the computer-readable medium 1006 to implement one or more functions described herein.

The beam configuration circuitry 1042 in cooperation with the transceiver 1010 may monitor for signals on downlink resources scheduled by a gNB, and decode the signals to determine whether the gNB transmitted information to the UE 1000 via a particular channel (e.g., a PDSCH). In some examples, the beam configuration circuitry 1042 may be configured to receive lists of component carriers from a base station (e.g., via RRC signaling, MAC-CE signaling, or other signaling). In some examples, the beam configuration circuitry 1042 may be configured to receive beam information from a base station (e.g., via RRC signaling, MAC-CE signaling, or other signaling). In some examples, the beam configuration circuitry 1042 may be configured to receive information that identifies one or more of the component carriers of the lists of component carriers. For example, the beam configuration circuitry 1042 may receive a MAC-CE that identifies a particular component carrier. As another example, the MAC-CE may indicate an update or modification of the list of component carriers previously indicated by RRC signaling. In some examples, the beam configuration circuitry 1042 may be configured to selectively apply the beam information to a set of component carriers. For example, the beam configuration circuitry 1042 may determine whether configuration information is to be used for a list of component carriers or for a single component carrier identified by the MAC-CE. This determination may be based on whether the UE 1000 has been configured with a list of component carriers (e.g., the beam configuration circuitry 1042 determines whether the UE 1000 received the list of component carriers). In some examples, the beam configuration circuitry 1042 may determine which set of a plurality of sets of component carriers includes the component carrier indicated by the MAC-CE. In some examples, the beam configuration circuitry 1042 may be configured to receive information that identifies a subset of the component carriers of the list of component carriers. For example, the MAC-CE may identify this subset.

The processor 1004 may include beam processing circuitry 1043 configured to perform beam processing-related operations as discussed herein (e.g., one or more of the operations described in conjunction with FIGS. 7-9). The beam processing circuitry 1043 may include functionality for a means for selectively applying TCI State IDs (e.g., as described at step 810 of FIG. 8 and/or step 910 of FIG. 9 and/or block 1106 of FIG. 11 and/or block 1208 of FIG. 12). The beam processing circuitry 1043 may include functionality for a means for receiving a downlink transmission (e.g., as described at step 814 of FIG. 8 and/or block 1108 of FIG. 11 and/or block 1210 of FIG. 12). The beam processing circuitry 1043 may include functionality for a means for selectively spatial relation information (e.g., as described at step 810 of FIG. 8 and/or step 910 of FIG. 9 and/or block 1306 of FIG. 13 and/or block 1408 of FIG. 14). The beam processing circuitry 1043 may include functionality for a means for transmitting an uplink transmission (e.g., as described at step 914 of FIG. 9 and/or block 1308 of FIG. 13 and/or block 1410 of FIG. 14). The beam processing circuitry 1043 may further be configured to execute beam processing software 1053 included on the computer-readable medium 1006 to implement one or more functions described herein.

In some examples, the beam processing circuitry 1043 may be configured to form a transmit beam for a PUSCH transmission, a PUCCH transmission, or an SRS transmission. For example, based on spatial relation information, the beam processing circuitry 1043 may identify beam information for a reference signal that may be used for an uplink transmission. In some examples, the beam processing circuitry 1043 may be configured to form a receive beam for a PDSCH transmission, a PDCCH transmission, or a DMRS transmission. For example, based on a TCI State ID, the beam processing circuitry 1043 may identify the transmit beam parameters used by a base station for a downlink transmission and set the parameters for a receive beam accordingly.

Figure 11:
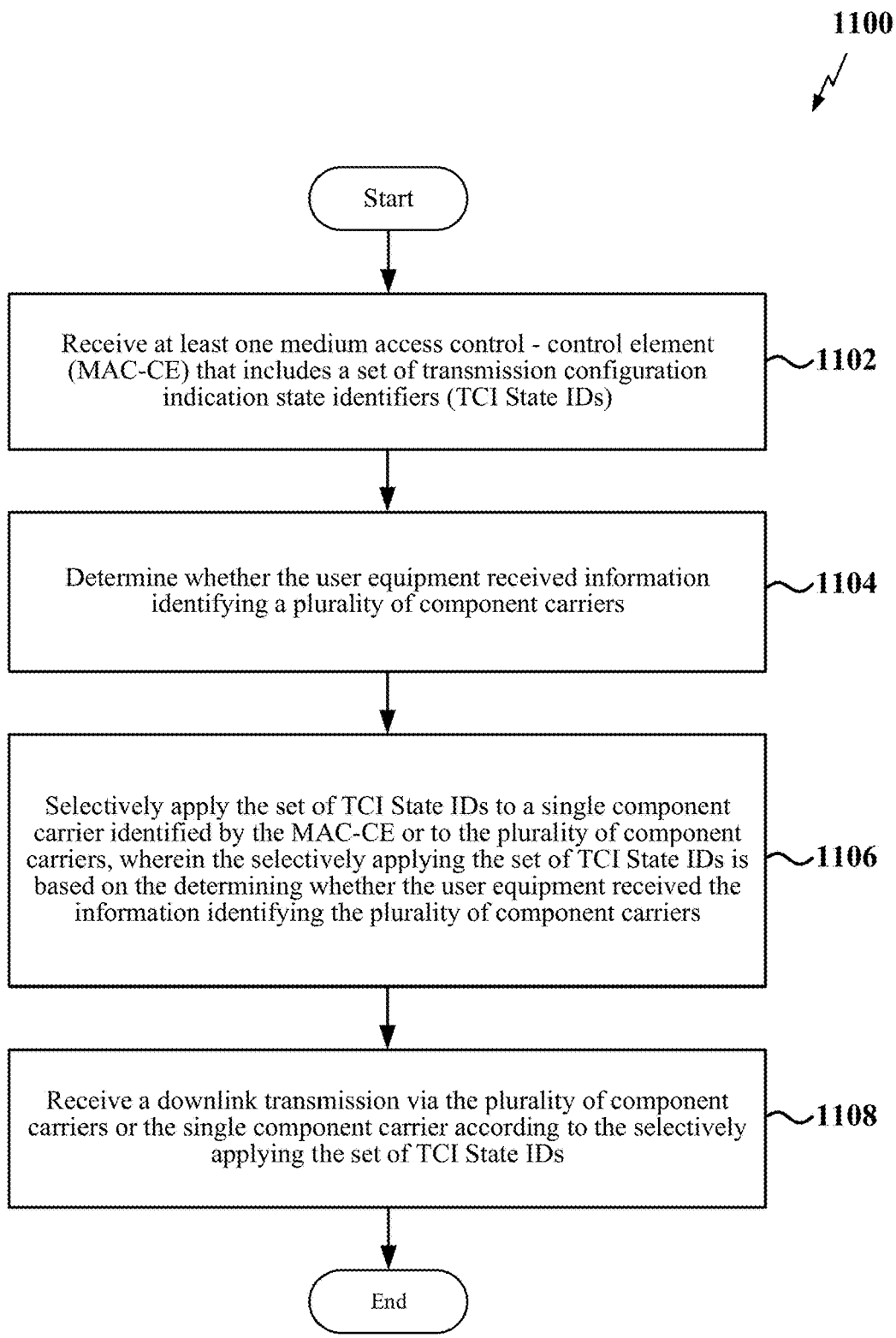
FIG. 11 is a flow chart illustrating an example of a communication process for applying a TCI for a downlink transmission according to some aspects.

FIG. 11 is a flow chart illustrating an example process 1100 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, a UE may receive at least one medium access control-control element (MAC-CE) including a set of transmission configuration indication state identifiers (TCI State IDs). For example, the beam configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The beam configuration circuitry 1042 may then parse the MAC-CE to determine whether the MAC-CE is activating and/or updating a TCI State ID.

At block 1104, the UE may determine whether the user equipment received information identifying a plurality of component carriers. For example, the beam configuration circuitry 1042 may determine whether the UE has been configured with a list of component carriers (serving cells) which can be updated simultaneously for TCI relation with a MAC CE. In some examples, the beam configuration circuitry 1042 identifies a list of component carriers that includes the component carrier identified by the MAC-CE received at block 1102.

At block 1106, the UE may selectively apply the set of TCI State IDs to a single component carrier identified by the MAC-CE or to the plurality of component carriers. In some examples, selectively applying the set of TCI State IDs is based on the determining whether the user equipment received the information identifying the plurality of component carriers. For example, the beam processing circuitry 1043, shown and described above in connection with FIG. 10, may identify beam parameters (e.g., a filter) to be used for receiving a downlink transmission from a gNB.

At block 1108, the UE may receive a downlink transmission via the plurality of component carriers or the single component carrier according to the selectively applying the set of TCI State IDs. For example, the beam processing circuitry 1043 together with the communication and processing circuitry 1041 and the transceiver 1010 may monitor a PDSCH channel on designated resources, applying the beam parameters to one or more component carriers as discussed herein.

In some examples, the method may further include determining whether the single component carrier indicated by the MAC-CE is a member of the plurality of component carriers. In this case, selectively applying the set of TCI State IDs may further be based on the determining whether the single component carrier indicated by the MAC-CE is a member of the plurality of component carriers.

In some examples, determining whether the single component carrier indicated by the MAC-CE is a member of the plurality of component carriers may include determining that the single component carrier indicated by the MAC-CE is a member of the plurality of component carriers and selectively applying the set of TCI State IDs may include applying the set of TCI State IDs to the plurality of component carriers.

In some examples, determining whether the single component carrier indicated by the MAC-CE is a member of the plurality of component carriers may include determining that the single component carrier indicated by the MAC-CE is not a member of the plurality of component carriers and selectively applying the set of TCI State IDs may include applying the set of TCI State IDs to the single component carrier.

In some examples, determining whether the single component carrier indicated by the MAC-CE is a member of the plurality of component carriers may include determining that the single component carrier indicated by the MAC-CE is a member of the plurality of component carriers and selectively applying the set of TCI State IDs may include applying to all bandwidth parts (BWPs) of the plurality of component carriers.

In some examples, determining whether the single component carrier indicated by the MAC-CE is a member of the plurality of component carriers may include determining that the single component carrier indicated by the MAC-CE is not a member of the plurality of component carriers and selectively applying the set of TCI State IDs may include applying the set of TCI State IDs to all bandwidth parts (BWPs) of the single component carrier.

In some examples, determining whether the user equipment received the information identifying the plurality of component carriers may include determining that the user equipment received the information identifying the plurality of component carriers, and selectively applying the set of TCI State IDs may include applying the set of TCI State IDs to the plurality of component carriers.

In some examples, determining whether the user equipment received the information identifying the plurality of component carriers may include determining that the user equipment received the information identifying the plurality of component carriers, and selectively applying the set of TCI State IDs may include applying the set of TCI State IDs to all bandwidth parts (BWPs) of the plurality of component carriers.

In some examples, determining whether the user equipment received the information identifying the plurality of component carriers may include determining that the user equipment did not receive the information identifying the plurality of component carriers, and selectively applying the set of TCI State IDs may include applying the set of TCI State IDs to the single component carrier.

In some examples, determining whether the user equipment received the information identifying the plurality of component carriers may include determining that the user equipment did not receive the information identifying the plurality of component carriers, and the selectively applying the set of TCI State IDs may include applying the set of TCI State IDs to all bandwidth parts (BWPs) of the single component carrier.

In some examples, the method may further include receiving the information identifying the plurality of component carriers via radio resource control (RRC) signaling. In this case, determining whether the user equipment received the information identifying the plurality of component carriers may include determining that the user equipment received the information identifying the plurality of component carriers.

In some examples, the method may further include receiving the information identifying the plurality of component carriers via MAC-CE signaling. In this case, determining whether the user equipment received the information identifying the plurality of component carriers may include determining that the user equipment received the information identifying the plurality of component carriers.

In some examples, the method may further include receiving information identifying a subset of the plurality of component carriers via the MAC-CE. Since RRC signaling might be relatively slow, the MAC-CE or some other signaling can be used to identify a subset of the CCs indicated by the RRC signaling, for example. Moreover, the MAC-CE can update or modify the applicable CC set indicated by the RRC signaling. In this way, the apparatus can modify/update the applicable CC set indicated by the RRC signaling at a faster pace.

Figure 12:
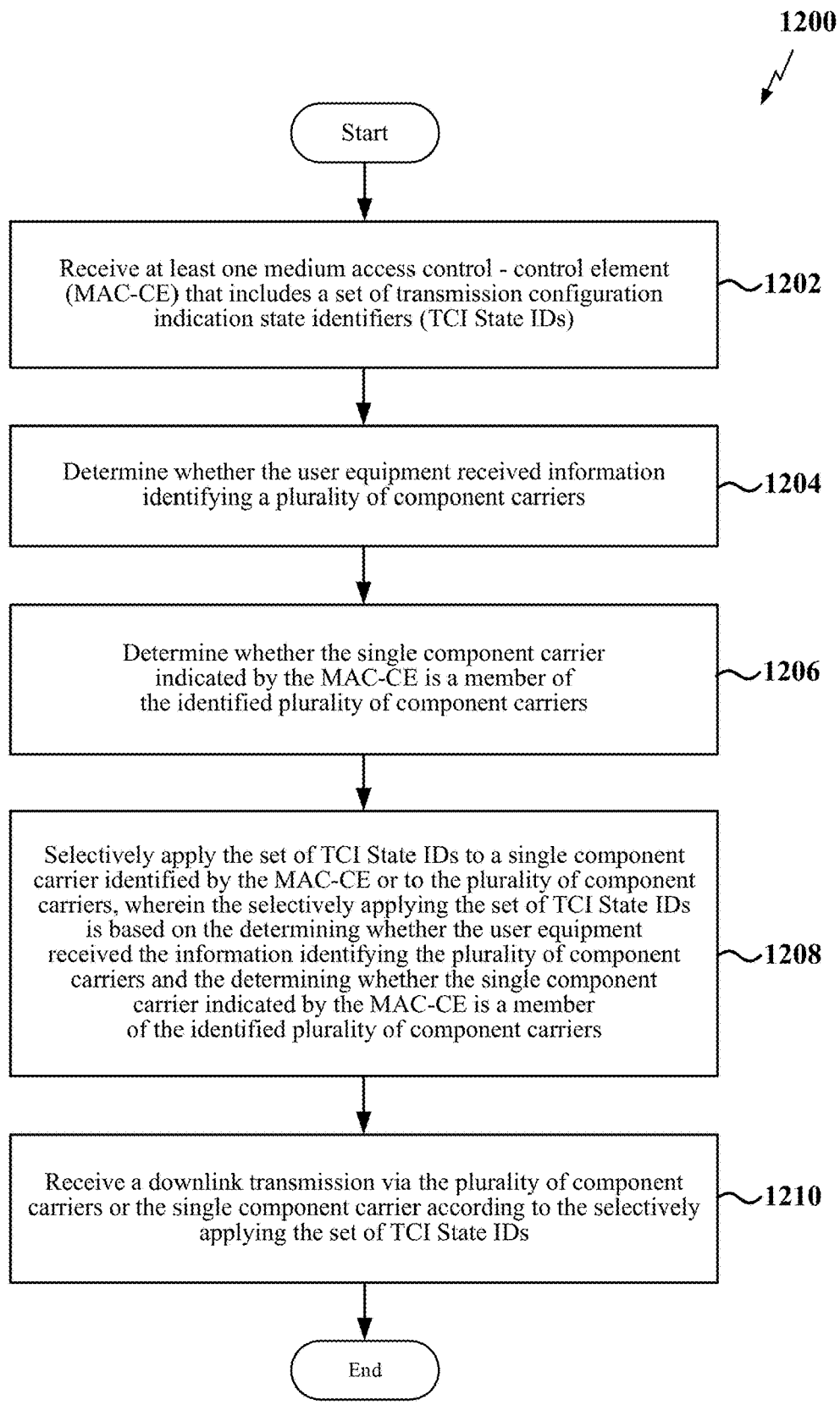
FIG. 12 is a flow chart illustrating another example of a communication process for applying a TCI for a downlink transmission according to some aspects.

FIG. 12 is a flow chart illustrating an example process 1200 for a wireless communication system in accordance with some aspects of the present disclosure. In some examples, the process 1200 may be performed in conjunction with (e.g., as part of or in addition to) the process 1100 of FIG. 11. As described below, some or all illustrated features may be omitted in a particular implementation within the scope of the present disclosure, and some illustrated features may not be required for implementation of all embodiments. In some examples, the process 1200 may be carried out by the UE 1000 illustrated in FIG. 10. In some examples, the process 1200 may be carried out by any suitable apparatus or means for carrying out the functions or algorithm described below.

At block 1202, a UE may receive at least one medium access control-control element (MAC-CE) including a set of transmission configuration indication state identifiers (TCI State IDs). For example, the beam configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The beam configuration circuitry 1042 may then parse the MAC-CE to determine whether the MAC-CE is activating and/or updating a TCI State ID.

At block 1204, the UE may determine whether the user equipment received information identifying a plurality of component carriers. For example, the beam configuration circuitry 1042 may determine whether the UE has been configured with a list of component carriers (serving cells) which can be updated simultaneously for TCI relation with a MAC CE.

At block 1206, the UE may determine whether the single component carrier indicated by the MAC-CE is a member of the plurality of component carriers. For example, the beam configuration circuitry 1042 may parse the MAC-CE to determine whether the MAC-CE identifies a component carrier and, if so, compare an identifier of that component carrier with the component carrier identifiers of a list of component carriers. In some examples, the beam configuration circuitry 1042 identifies a list of component carriers that includes the component carrier identified by the MAC-CE received at block 1202.

At block 1208, the UE may selectively apply the set of TCI State IDs to a single component carrier identified by the MAC-CE or to the plurality of component carriers. In some examples, selectively applying the set of TCI State IDs is based on the determining whether the user equipment received the information identifying the plurality of component carriers and the determining whether the single component carrier indicated by the MAC-CE is a member of the plurality of component carriers.

For example, the beam processing circuitry 1043, shown and described above in connection with FIG. 10, may identify beam parameters (e.g., a filter) to be used for receiving a downlink transmission from a gNB via one or more component carriers.

At block 1210, the UE may receive a downlink transmission via the plurality of component carriers or the single component carrier according to the selectively applying the set of TCI State IDs. For example, the beam processing circuitry 1043 together with the communication and processing circuitry 1041 and the transceiver 1010 may monitor a PDSCH channel on designated resources, applying the beam parameters to one or more component carriers as discussed herein.

Figure 13:
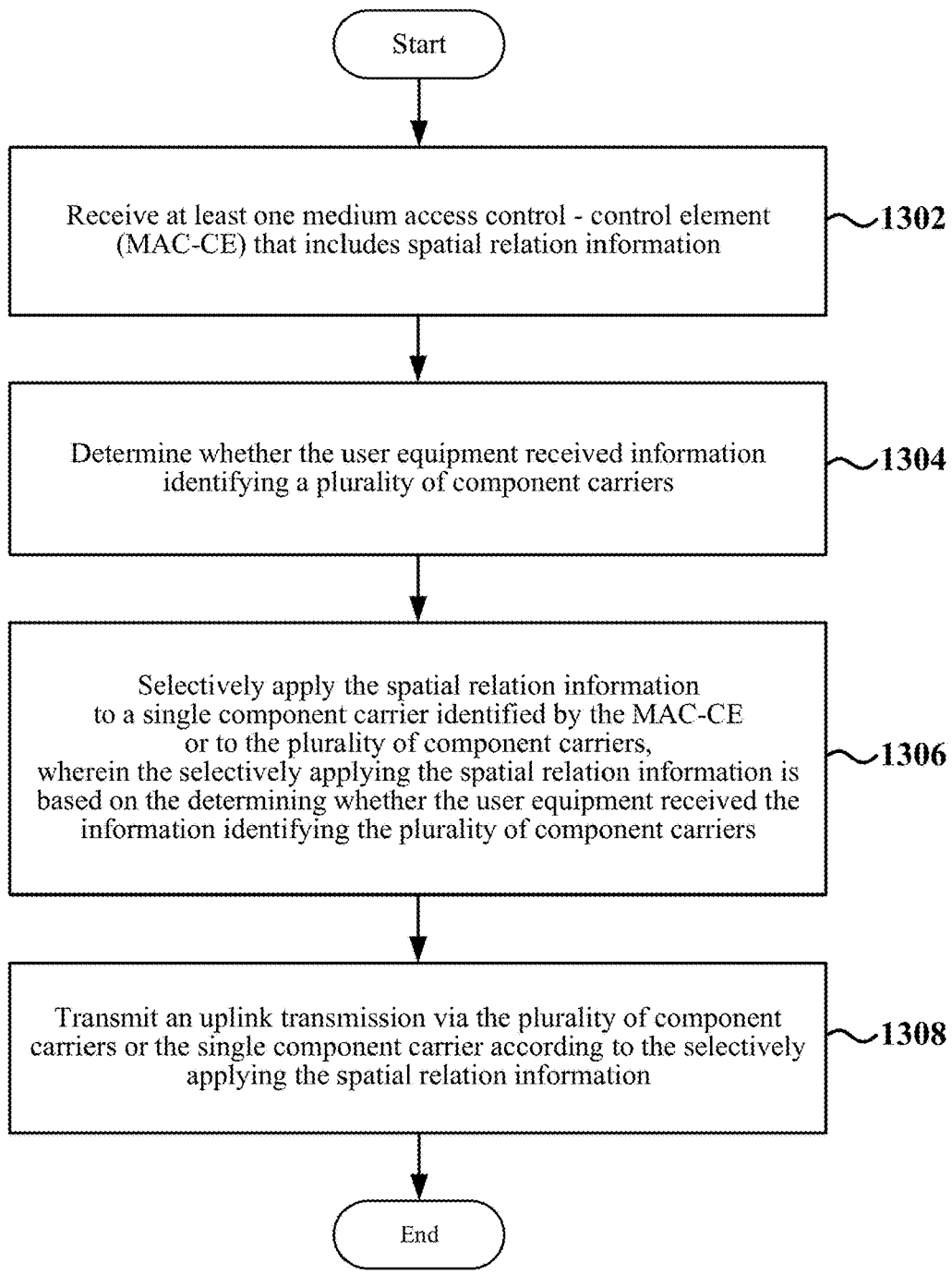
FIG. 13 is a flow chart illustrating an example of a communication process for applying spatial relation information for an uplink transmission according to some aspects.

FIG. 13 is a flow chart illustrating an example process 1300 for a wireless communication system in accordance with some aspects of the present disclosure. In some examples, the process 1300 may be performed in conjunction with (e.g., as part of or in addition to) the process 1100 of FIG. 11. As described below, some or all illustrated features may be omitted in a particular implementation within the scope of the present disclosure, and some illustrated features may not be required for implementation of all embodiments. In some examples, the process 1300 may be carried out by the UE 1000 illustrated in FIG. 10. In some examples, the process 1300 may be carried out by any suitable apparatus or means for carrying out the functions or algorithm described below.

At block 1302, a UE may receive at least one medium access control-control element (MAC-CE) including spatial relation information. For example, the beam configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The beam configuration circuitry 1042 may then parse the MAC-CE to determine whether the MAC-CE is activating and/or updating spatial relation information.

At block 1304, the UE may the UE may determine whether the user equipment received information identifying a plurality of component carriers. For example, the beam configuration circuitry 1042 may determine whether the UE has been configured with a list of component carriers (serving cells) which can be updated simultaneously for spatial relation with a MAC CE. In some examples, the beam configuration circuitry 1042 identifies a list of component carriers that includes the component carrier identified by the MAC-CE received at block 1102.

At block 1306, the UE may selectively apply the spatial relation information to a single component carrier identified by the MAC-CE or to the plurality of component carriers. In some examples, selectively applying the spatial relation information is based on the determining whether the user equipment received the information identifying the plurality of component carriers. For example, the beam processing circuitry 1043, shown and described above in connection with FIG. 10, may identify beam parameters (e.g., a filter) to be used for transmitting an uplink transmission to a gNB.

At block 1308, the UE may transmit an uplink transmission via the plurality of component carriers or the single component carrier according to the selectively applying the spatial relation information. For example, the beam processing circuitry 1043 together with the communication and processing circuitry 1041 and the transceiver 1010 may apply the beam parameters to one or more component carriers as discussed herein to transmit on a PUSCH channel via designated resources.

In some examples, the method may further include determining whether the single component carrier indicated by the MAC-CE is a member of the plurality of component carriers. In this case, selectively applying the spatial relation information may further be based on the determining whether the single component carrier indicated by the MAC-CE is a member of the plurality of component carriers.

In some examples, determining whether the single component carrier indicated by the MAC-CE is a member of the plurality of component carriers may include determining that the single component carrier indicated by the MAC-CE is a member of the plurality of component carriers and selectively applying the spatial relation information may include applying the spatial relation information to the plurality of component carriers.

In some examples, determining whether the single component carrier indicated by the MAC-CE is a member of the plurality of component carriers may include determining that the single component carrier indicated by the MAC-CE is not a member of the plurality of component carriers and selectively applying the spatial relation information may include applying the spatial relation information to the single component carrier.

In some examples, determining whether the single component carrier indicated by the MAC-CE is a member of the plurality of component carriers may include determining that the single component carrier indicated by the MAC-CE is a member of the plurality of component carriers and selectively applying the spatial relation information may include applying to all bandwidth parts (BWPs) of the plurality of component carriers.

In some examples, determining whether the single component carrier indicated by the MAC-CE is a member of the plurality of component carriers may include determining that the single component carrier indicated by the MAC-CE is not a member of the plurality of component carriers and selectively applying the spatial relation information may include applying the spatial relation information to all bandwidth parts (BWPs) of the single component carrier.

In some examples, determining whether the user equipment received the information identifying the plurality of component carriers may include determining that the user equipment received the information identifying the plurality of component carriers, and selectively applying the spatial relation information may include applying the spatial relation information to the plurality of component carriers.

In some examples, determining whether the user equipment received the information identifying the plurality of component carriers may include determining that the user equipment received the information identifying the plurality of component carriers, and selectively applying the spatial relation information may include applying the spatial relation information to all bandwidth parts (BWPs) of the plurality of component carriers.

In some examples, determining whether the user equipment received the information identifying the plurality of component carriers may include determining that the user equipment did not receive the information identifying the plurality of component carriers, and selectively applying the spatial relation information may include applying the spatial relation information to the single component carrier.

In some examples, the determining whether the user equipment received the information identifying the plurality of component carriers may include determining that the user equipment did not receive the information identifying the plurality of component carriers, and the selectively applying the spatial relation information may include applying the spatial relation information to all bandwidth parts (BWPs) of the single component carrier.

In some examples, the method may further include receiving the information identifying the plurality of component carriers via radio resource control (RRC) signaling. In this case, determining whether the user equipment received the information identifying the plurality of component carriers may include determining that the user equipment received the information identifying the plurality of component carriers.

In some examples, the method may further include receiving the information identifying the plurality of component carriers via MAC-CE signaling. In this case, determining whether the user equipment received the information identifying the plurality of component carriers may include determining that the user equipment received the information identifying the plurality of component carriers.

In some examples, the method may further include receiving information identifying a subset of the plurality of component carriers via the MAC-CE.

Figure 14:
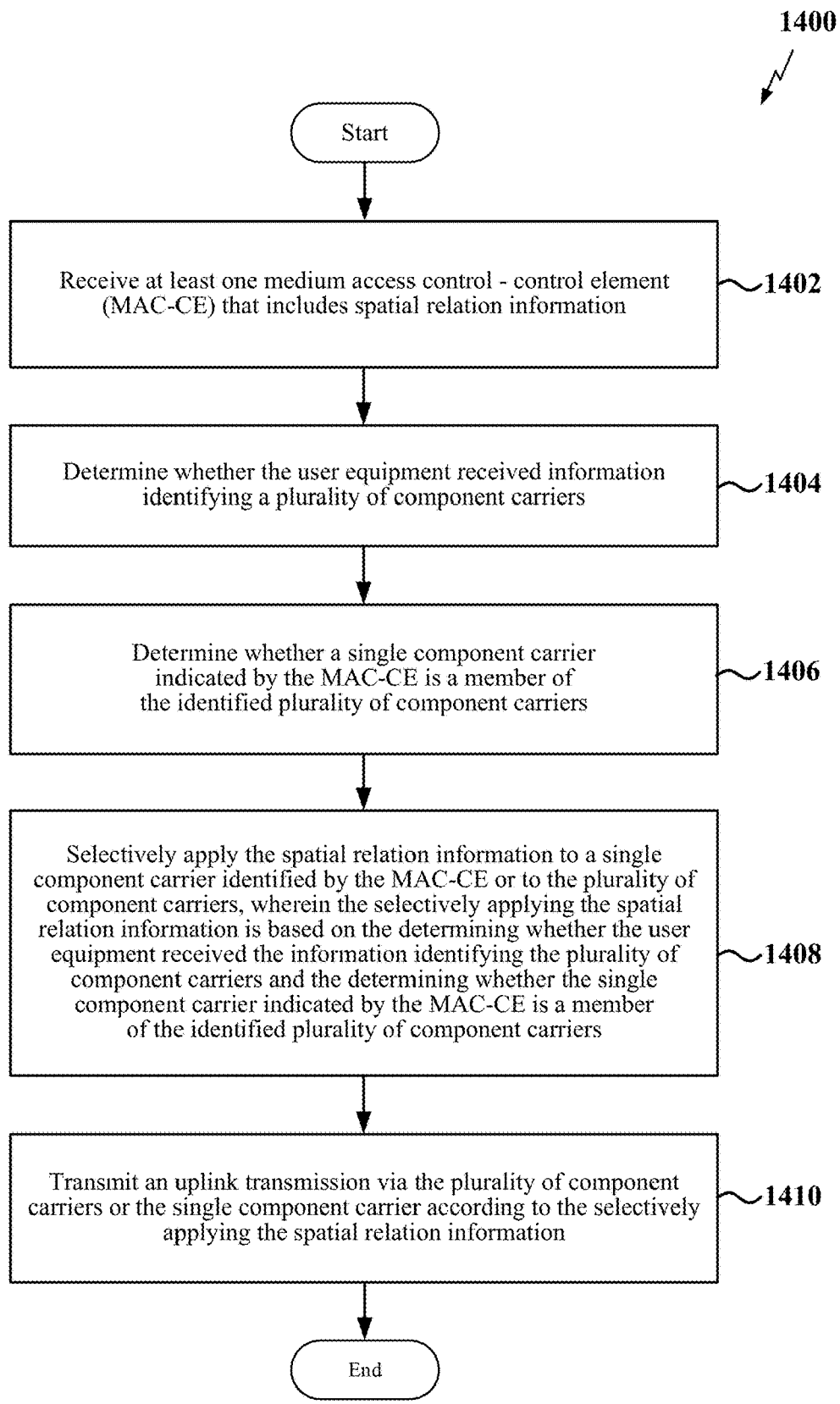
FIG. 14 is a flow chart illustrating another example of a communication process for applying spatial relation information for an uplink transmission according to some aspects.

FIG. 14 is a flow chart illustrating an example process 1400 for a wireless communication system in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the UE 1000 illustrated in FIG. 10. In some examples, the process 1400 may be carried out by any suitable apparatus or means for carrying out the functions or algorithm described below.

At block 1402, a UE may receive at least one medium access control-control element (MAC-CE) including spatial relation information. For example, the beam configuration circuitry 1042 together with the communication and processing circuitry 1041 and the transceiver 1010, shown and described above in connection with FIG. 10, may monitor a designated PDSCH and decode signals received on that channel to determine whether a gNB has transmitted a MAC-CE to the UE. The beam configuration circuitry 1042 may then parse the MAC-CE to determine whether the MAC-CE is activating and/or updating spatial relation information.

At block 1404, the UE may the UE may determine whether the user equipment received information identifying a plurality of component carriers. For example, the beam configuration circuitry 1042 may determine whether the UE has been configured with a list of component carriers (serving cells) which can be updated simultaneously for spatial relation with a MAC CE. In some examples, the beam configuration circuitry 1042 identifies a list of component carriers that includes the component carrier identified by the MAC-CE received at block 1402.

At block 1406, the UE may determine whether the single component carrier indicated by the MAC-CE is a member of the plurality of component carriers. For example, the beam configuration circuitry 1042 may parse the MAC-CE to determine whether the MAC-CE identifies a component carrier and, if so, compare an identifier of that component carrier with the component carrier identifiers of a list of component carriers. In some examples, the beam configuration circuitry 1042 identifies a list of component carriers that includes the component carrier identified by the MAC-CE received at block 1402.

At block 1408, the UE may selectively apply the spatial relation information to a single component carrier identified by the MAC-CE or to the plurality of component carriers. In some examples, selectively applying the spatial relation information is based on the determining whether the user equipment received the information identifying the plurality of component carriers and the determining whether the single component carrier indicated by the MAC-CE is a member of the plurality of component carriers. For example, the beam processing circuitry 1043, shown and described above in connection with FIG. 10, may identify beam parameters (e.g., a filter) to be used for transmitting an uplink transmission to a gNB via one or more component carriers.

At block 1410, the UE may transmit an uplink transmission via the plurality of component carriers or the single component carrier according to the selectively applying the spatial relation information. For example, the beam processing circuitry 1043 together with the communication and processing circuitry 1041 and the transceiver 1010 may apply the beam parameters to one or more component carriers as discussed herein to transmit on a PUSCH channel via designated resources.

The following provides an overview of examples of the present disclosure.

Example 1: A method for wireless communication at a user equipment, the method comprising: receiving at least one medium access control-control element (MAC-CE) comprising a set of transmission configuration indication state identifiers (TCI State IDs); determining whether the user equipment received information identifying a plurality of component carriers; selectively applying the set of TCI State IDs to a single component carrier identified by the MAC-CE or to the plurality of component carriers, wherein the selectively applying the set of TCI State IDs is based on the determining whether the user equipment received the information identifying the plurality of component carriers; and receiving a downlink transmission via the plurality of component carriers or the single component carrier according to the selectively applying the set of TCI State IDs.

Example 2: The method of example 1, further comprising: determining whether the single component carrier indicated by the MAC-CE is a member of the plurality of component carriers; wherein the selectively applying the set of TCI State IDs is further based on the determining whether the single component carrier indicated by the MAC-CE is a member of the plurality of component carriers.

Example 3: The method of example 2, wherein: the determining whether the single component carrier indicated by the MAC-CE is a member of the plurality of component carriers comprises determining that the single component carrier indicated by the MAC-CE is a member of the plurality of component carriers; and the selectively applying the set of TCI State IDs comprises applying the set of TCI State IDs to the plurality of component carriers.

Example 4: The method of example 2, wherein: the determining whether the single component carrier indicated by the MAC-CE is a member of the plurality of component carriers comprises determining that the single component carrier indicated by the MAC-CE is not a member of the plurality of component carriers; and the selectively applying the set of TCI State IDs comprises applying the set of TCI State IDs to the single component carrier.

Example 5: The method of any of examples 1 through 4, wherein: the determining whether the user equipment received the information identifying the plurality of component carriers comprises determining that the user equipment received the information identifying the plurality of component carriers; and the selectively applying the set of TCI State IDs comprises applying the set of TCI State IDs to the plurality of component carriers.

Example 6: The method of any of examples 1 through 5, wherein: the determining whether the user equipment received the information identifying the plurality of component carriers comprises determining that the user equipment received the information identifying the plurality of component carriers; and the selectively applying the set of TCI State IDs comprises applying the set of TCI State IDs to all bandwidth parts (BWPs) of the plurality of component carriers.

Example 7: The method of any of examples 1 through 6, wherein: the determining whether the user equipment received the information identifying the plurality of component carriers comprises determining that the user equipment did not receive the information identifying the plurality of component carriers; and the selectively applying the set of TCI State IDs comprises applying the set of TCI State IDs to the single component carrier.

Example 8: The method of any of examples 1 through 7, wherein: the determining whether the user equipment received the information identifying the plurality of component carriers comprises determining that the user equipment did not receive the information identifying the plurality of component carriers; and the selectively applying the set of TCI State IDs comprises applying the set of TCI State IDs to all bandwidth parts (BWPs) of the single component carrier.

Example 9: The method of any of examples 1 through 8, further comprising: receiving the information identifying the plurality of component carriers via radio resource control (RRC) signaling; wherein the determining whether the user equipment received the information identifying the plurality of component carriers comprises determining that the user equipment received the information identifying the plurality of component carriers.

Example 10: The method of any of examples 1 through 9, further comprising: receiving the information identifying the plurality of component carriers via MAC-CE signaling; wherein the determining whether the user equipment received the information identifying the plurality of component carriers comprises determining that the user equipment received the information identifying the plurality of component carriers.

Example 11: The method of any of examples 1 through 9, further comprising: receiving information identifying a subset of the plurality of component carriers via the MAC-CE.

Example 12: A user equipment (UE) in a wireless communication network, the UE comprising a transceiver configured to communicate with a radio access network, a memory, and a processor coupled to the transceiver and the memory, the processor and memory configured to perform a method of any one of examples 1 through 11.

Example 13: An apparatus configured for wireless communication comprising at least one means for performing a method of any one of examples 1 through 11.

Example 14: A non-transitory computer-readable medium storing computer-executable code, comprising code for causing an apparatus to perform a method of any one of examples 1 through 11.

Example 15: A method for wireless communication at a user equipment, the method comprising: receiving at least one medium access control-control element (MAC-CE) comprising spatial relation information; determining whether the user equipment received information identifying a plurality of component carriers; selectively applying the spatial relation information to a single component carrier identified by the MAC-CE or to the plurality of component carriers, wherein the selectively applying the spatial relation information is based on the determining whether the user equipment received the information identifying the plurality of component carriers; and transmitting an uplink transmission via the plurality of component carriers or the single component carrier according to the selectively applying the spatial relation information.

Example 16: The method of example 15, further comprising: determining whether the single component carrier indicated by the MAC-CE is a member of the plurality of component carriers; wherein the selectively applying the spatial relation information is further based on the determining whether the single component carrier indicated by the MAC-CE is a member of the plurality of component carriers.

Example 17: The method of example 16, wherein: the determining whether the single component carrier indicated by the MAC-CE is a member of the plurality of component carriers comprises determining that the single component carrier indicated by the MAC-CE is a member of the plurality of component carriers; and the selectively applying the spatial relation information comprises applying the spatial relation information to the plurality of component carriers.

Example 18: The method of example 16, wherein: the determining whether the single component carrier indicated by the MAC-CE is a member of the plurality of component carriers comprises determining that the single component carrier indicated by the MAC-CE is not a member of the plurality of component carriers; and the selectively applying the spatial relation information comprises applying the spatial relation information to the single component carrier.

Example 19: The method of any of examples 15 through 18, wherein: the determining whether the user equipment received the information identifying the plurality of component carriers comprises determining that the user equipment received the information identifying the plurality of component carriers; and the selectively applying the spatial relation information comprises applying the spatial relation information to the plurality of component carriers.

Example 20: The method of any of examples 15 through 19, wherein: the determining whether the user equipment received the information identifying the plurality of component carriers comprises determining that the user equipment received the information identifying the plurality of component carriers; and the selectively applying the spatial relation information comprises applying the spatial relation information to all bandwidth parts (BWPs) of the plurality of component carriers.

Example 21: The method of any of examples 15 through 20, wherein: the determining whether the user equipment received the information identifying the plurality of component carriers comprises determining that the user equipment did not receive the information identifying the plurality of component carriers; and the selectively applying the spatial relation information comprises applying the spatial relation information to the single component carrier.

Example 22: The method of any of examples 15 through 21, wherein: the determining whether the user equipment received the information identifying the plurality of component carriers comprises determining that the user equipment did not receive the information identifying the plurality of component carriers; and the selectively applying the spatial relation information comprises applying the spatial relation information to all bandwidth parts (BWPs) of the single component carrier.

Example 23: The method of any of examples 15 through 22, further comprising: receiving the information identifying the plurality of component carriers via radio resource control (RRC) signaling; wherein the determining whether the user equipment received the information identifying the plurality of component carriers comprises determining that the user equipment received the information identifying the plurality of component carriers.

Example 24: The method of any of examples 15 through 23, further comprising: receiving the information identifying the plurality of component carriers via MAC-CE signaling; wherein the determining whether the user equipment received the information identifying the plurality of component carriers comprises determining that the user equipment received the information identifying the plurality of component carriers.

Example 25: The method of any of examples 15 through 24, further comprising: receiving information identifying a subset of the plurality of component carriers via the MAC-CE.

Example 26: A user equipment (UE) in a wireless communication network, the UE comprising a transceiver configured to communicate with a radio access network, a memory, and a processor coupled to the transceiver and the memory, the processor and memory configured to perform a method of any one of examples 15 through 25.

Example 27: An apparatus configured for wireless communication comprising at least one means for performing a method of any one of examples 15 through 25.

Example 28: A non-transitory computer-readable medium storing computer-executable code, comprising code for causing an apparatus to perform a method of any one of examples 15 through 25.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment, comprising:
one or more memories; and
one or more processors coupled to the one or more memories, wherein the one or more processors are configured to:
receive at least one medium access control-control element (MAC-CE) comprising spatial relation information;
determine whether a single component carrier indicated by the MAC-CE is a member of a plurality of component carriers, or determine whether the user equipment received information identifying the plurality of component carriers;
selectively apply the spatial relation information to the single component carrier indicated by the MAC-CE or to the plurality of component carriers depending on a result of the determination of whether the single component carrier indicated by the MAC-CE is the member of the plurality of component carriers, or depending on a result of the determination of whether the user equipment received the information identifying the plurality of component carriers; and transmit an uplink transmission via the plurality of component carriers or the single component carrier according to the selectively applying the spatial relation information, wherein the one or more processors are further configured to:
  based on a determination that the single component carrier indicated by the MAC-CE is the member of the plurality of component carriers, apply the spatial relation information to the plurality of component carriers or apply the spatial relation information to all bandwidth parts (BWPs) of the plurality of component carriers; or
  based on a determination that the single component carrier indicated by the MAC-CE is not the member of the plurality of component carriers, apply the spatial relation information to the single component carrier or apply the spatial relation information to all bandwidth parts (BWPs) of the single component carrier; or
  based on a determination that the user equipment did not receive the information identifying the plurality of component carriers, apply the spatial relation information to the single component carrier or apply the spatial relation information to all bandwidth parts (BWPs) of the single component carrier.

2. The user equipment of claim 1, wherein the one or more processors are configured to:
  determine that the single component carrier indicated by the MAC-CE is the member of a plurality of component carriers; and
  apply the spatial relation information to all bandwidth parts (BWPs) of the plurality of component carriers based on the determination that the single component carrier indicated by the MAC-CE is the member of the plurality of component carriers.

3. The user equipment of claim 1, wherein the one or more processors are configured to:
  determine that the single component carrier indicated by the MAC-CE is not the member of a plurality of component carriers; and
  apply the spatial relation information to all bandwidth parts (BWPs) of the single component carrier based on the determination that the single component carrier indicated by the MAC-CE is not the member of the plurality of component carriers.

4. The user equipment of claim 1, wherein the one or more processors are configured to:
  determine that the single component carrier indicated by the MAC-CE is the member of a plurality of component carriers; and
  apply the spatial relation information to the plurality of component carriers based on the determination that the single component carrier indicated by the MAC-CE is the member of the plurality of component carriers.

5. The user equipment of claim 1, wherein the one or more processors are configured to:
  determine that the single component carrier indicated by the MAC-CE is not the member of a plurality of component carriers; and
  apply the spatial relation information to the single component carrier based on the determination that the single component carrier indicated by the MAC-CE is not the member of the plurality of component carriers.

6. The user equipment of claim 1, wherein the one or more processors are configured to:
  determine that the user equipment did not receive the information identifying the plurality of component carriers; and
  apply the spatial relation information to the single component carrier based on the determination that the user equipment did not receive the information identifying the plurality of component carriers.

7. The user equipment of claim 1, wherein the one or more processors are configured to:
  determine that the user equipment did not receive the information identifying the plurality of component carriers; and
  apply the spatial relation information to all bandwidth parts (BWPs) of the single component carrier based on the determination that the user equipment did not receive the information identifying the plurality of component carriers.

8. A method for wireless communication at a user equipment, the method comprising:
  receiving at least one medium access control-control element (MAC-CE) comprising spatial relation information;
  determining whether a single component carrier indicated by the MAC-CE is a member of a plurality of component carriers, or determining whether the user equipment received information identifying the plurality of component carriers;
  selectively applying the spatial relation information to the single component carrier indicated by the MAC-CE or to the plurality of component carriers depending on a result of the determination of whether the single component carrier indicated by the MAC-CE is the member of the plurality of component carriers, or depending on a result of the determination of whether the user equipment received the information identifying the plurality of component carriers; and
  transmitting an uplink transmission via the plurality of component carriers or the single component carrier according to the selectively applying the spatial relation information,
  wherein the method further comprises:
    based on a determination that the single component carrier indicated by the MAC-CE is the member of the plurality of component carriers, applying the spatial relation information to the plurality of component carriers or applying the spatial relation information to all bandwidth parts (BWPs) of the plurality of component carriers; or
    based on a determination that the single component carrier indicated by the MAC-CE is not the member of the plurality of component carriers, applying the spatial relation information to the single component carrier or applying the spatial relation information to all bandwidth parts (BWPs) of the single component carrier; or
    based on a determination that the user equipment did not receive the information identifying the plurality of component carriers, applying the spatial relation information to the single component carrier or applying the spatial relation information to all bandwidth parts (BWPs) of the single component carrier.

9. The method of claim 8, comprising:
  determining that the single component carrier indicated by the MAC-CE is the member of a plurality of component carriers; and
  applying the spatial relation information to all bandwidth parts (BWPs) of the plurality of component carriers based on the determination that the single component carrier indicated by the MAC-CE is the member of the plurality of component carriers.

10. The method of claim 8, comprising:
determining that the single component carrier indicated by the MAC-CE is not the member of a plurality of component carriers; and
applying the spatial relation information to all bandwidth parts (BWPs) of the single component carrier based on the determination that the single component carrier indicated by the MAC-CE is not the member of the plurality of component carriers.

11. The method of claim 8, comprising:
determining that the single component carrier indicated by the MAC-CE is the member of a plurality of component carriers; and
applying the spatial relation information to the plurality of component carriers based on the determination that the single component carrier indicated by the MAC-CE is the member of the plurality of component carriers.

12. The method of claim 8, comprising:
determining that the single component carrier indicated by the MAC-CE is not the member of a plurality of component carriers; and
applying the spatial relation information to the single component carrier based on the determination that the single component carrier indicated by the MAC-CE is not the member of the plurality of component carriers.

13. The method of claim 8, comprising:
determining that the user equipment did not receive the information identifying the plurality of component carriers; and
applying the spatial relation information to the single component carrier based on the determination that the user equipment did not receive the information identifying the plurality of component carriers.

14. The method of claim 8, comprising:
determining that the user equipment did not receive the information identifying the plurality of component carriers; and
applying the spatial relation information to all bandwidth parts (BWPs) of the single component carrier based on the determination that the user equipment did not receive the information identifying the plurality of component carriers.

* * * * *